April 16, 1929.  L. M. POTTS  1,708,954
TRANSMISSION SYSTEM
Filed Sept. 17, 1925   11 Sheets-Sheet 4

Inventor:
Louis M. Potts
by [signature] Atty.

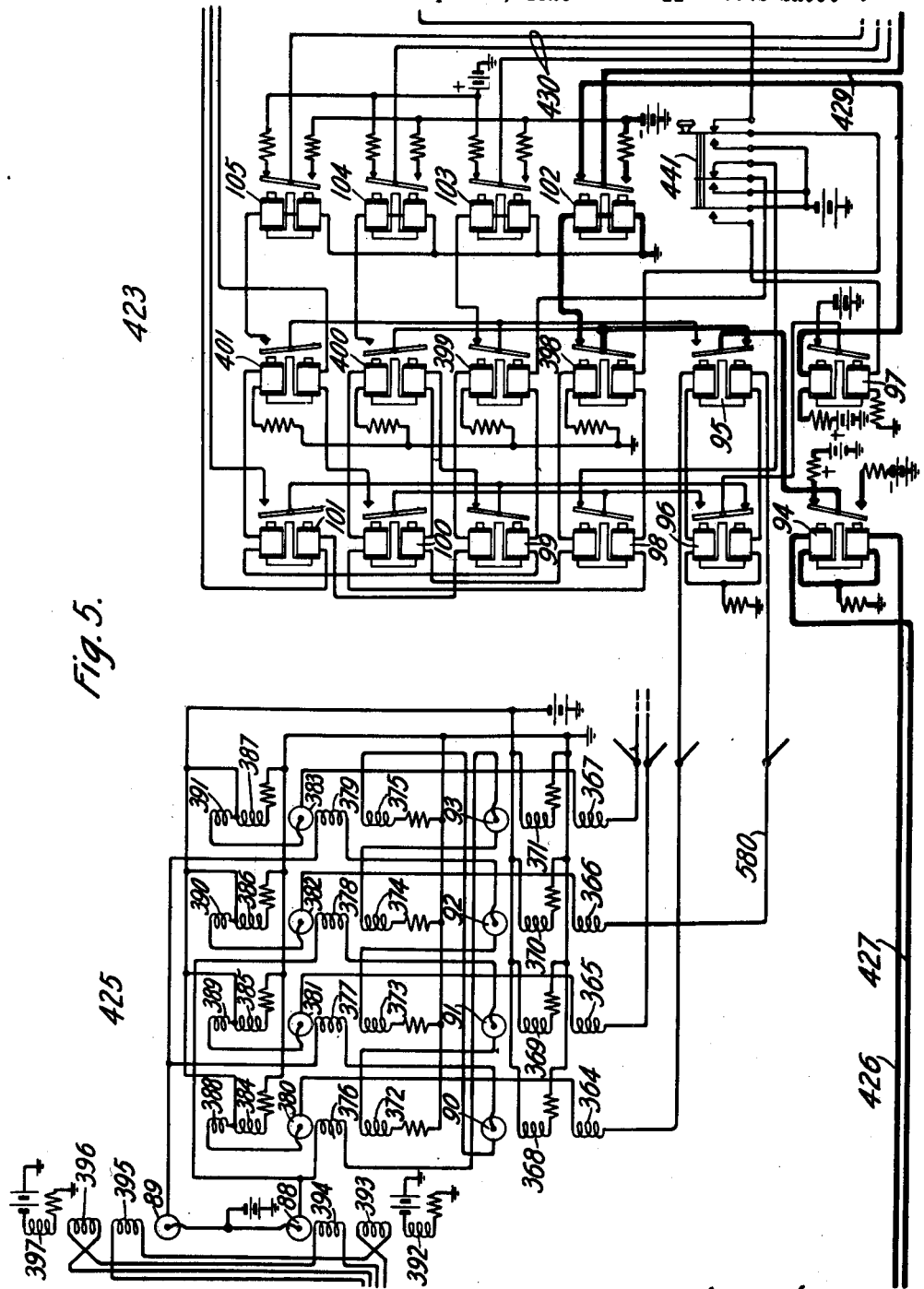

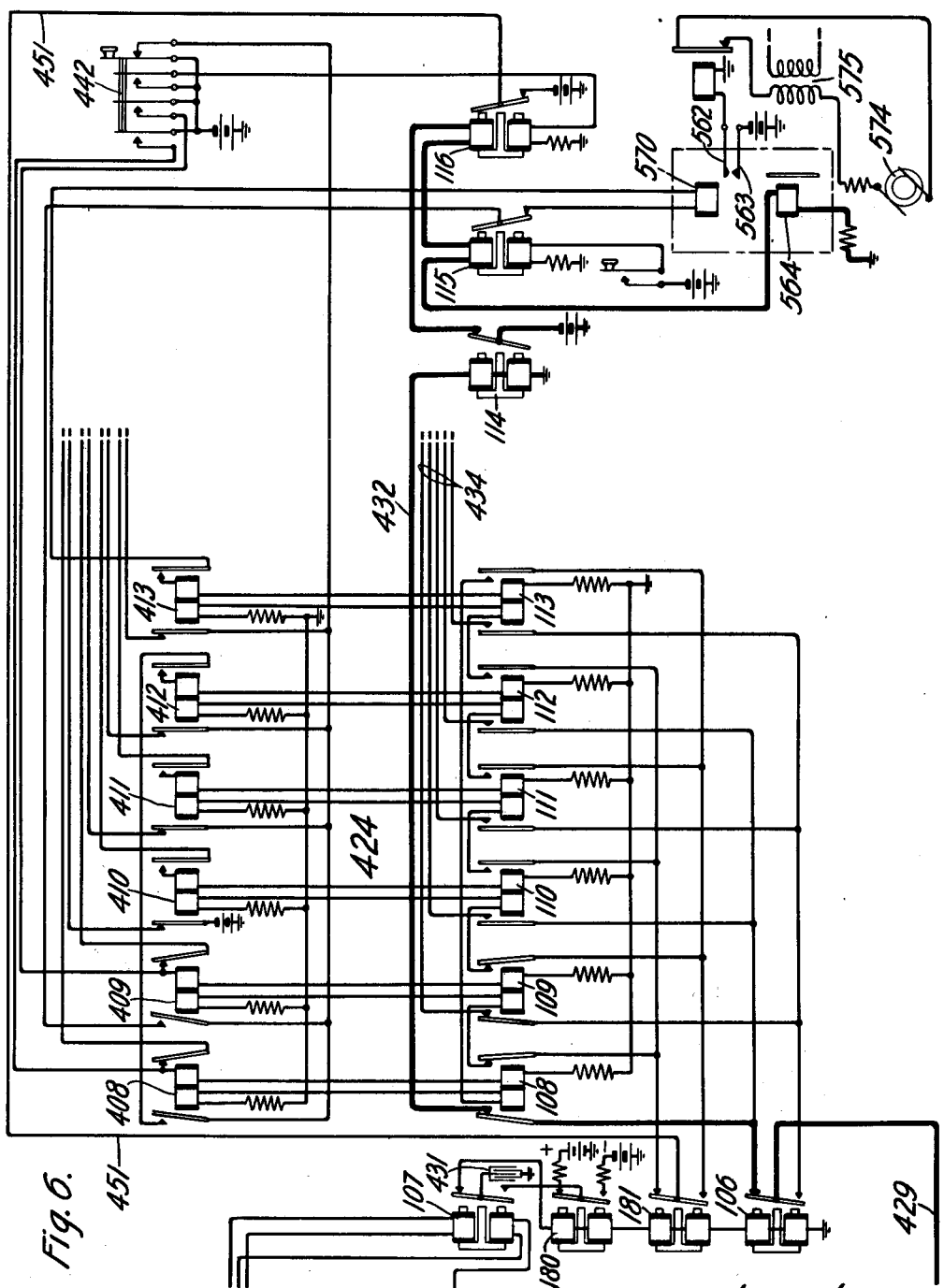

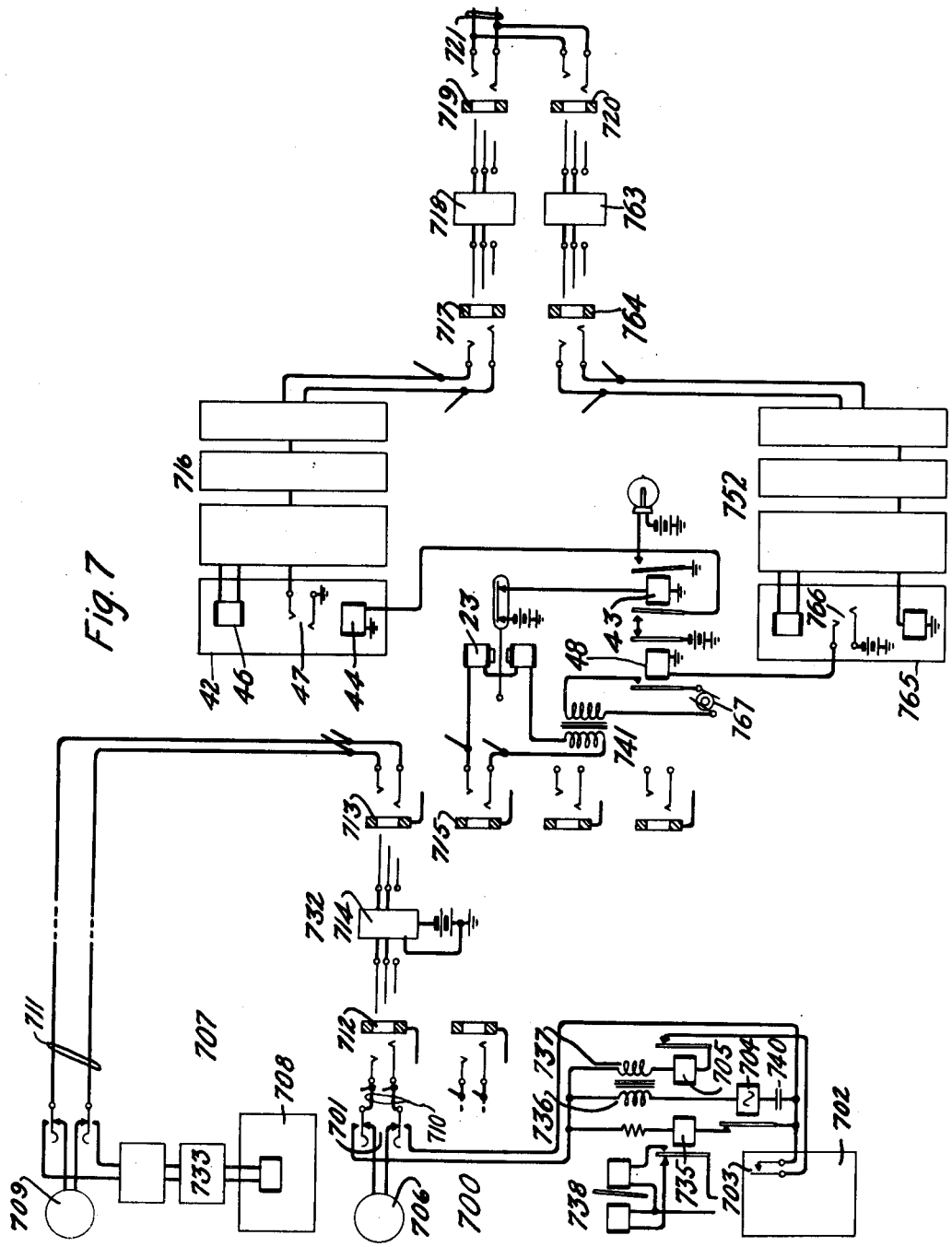

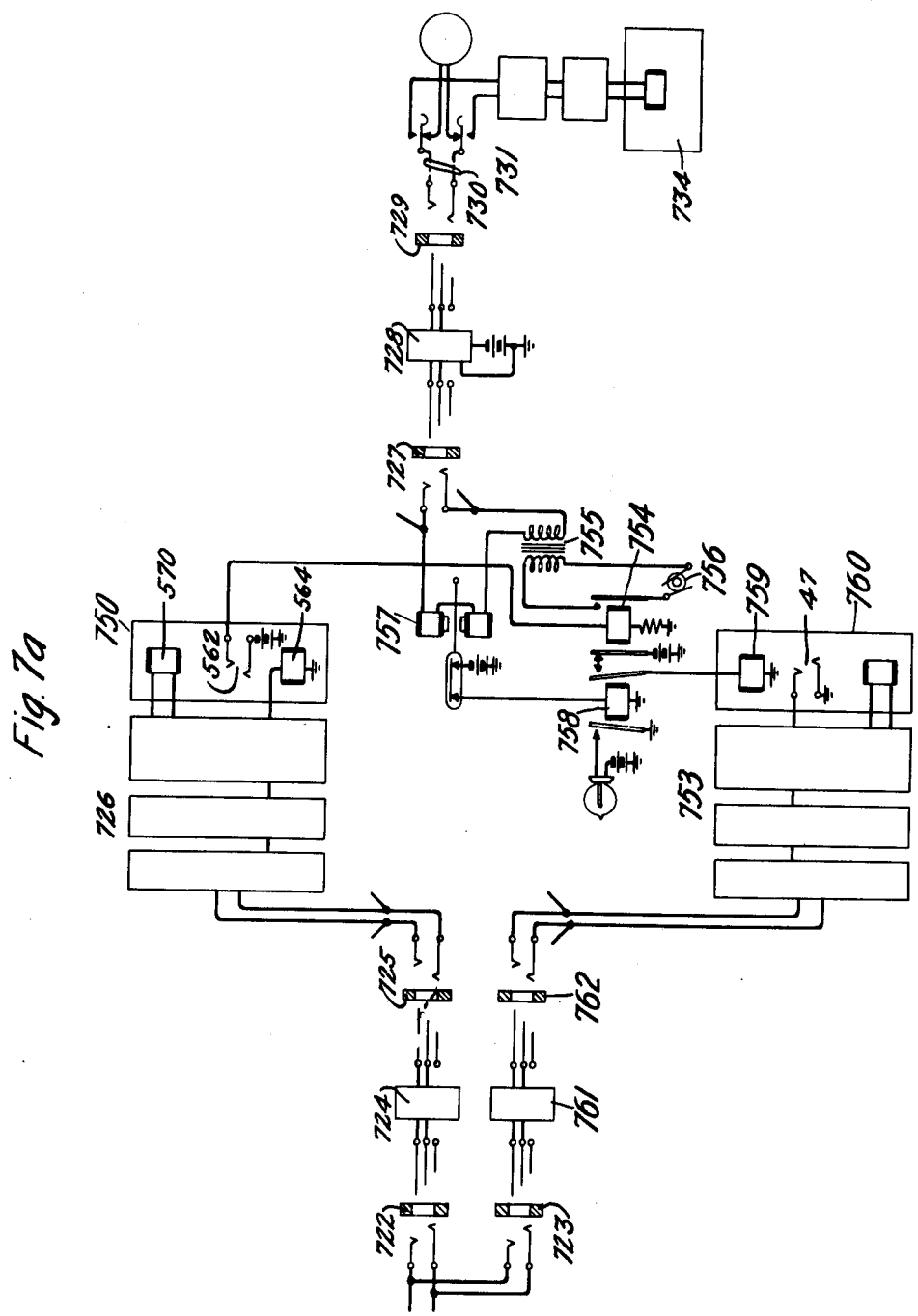

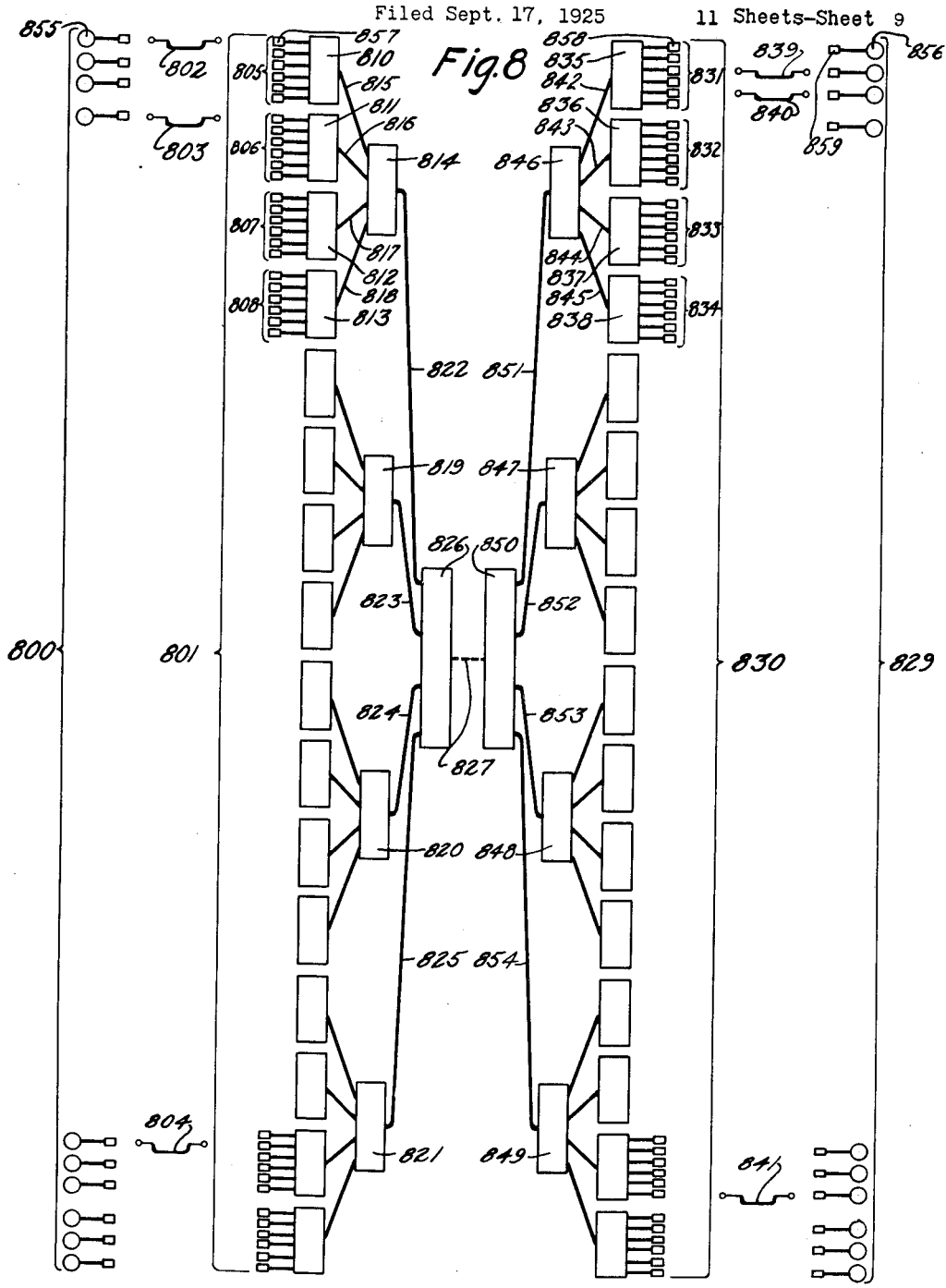

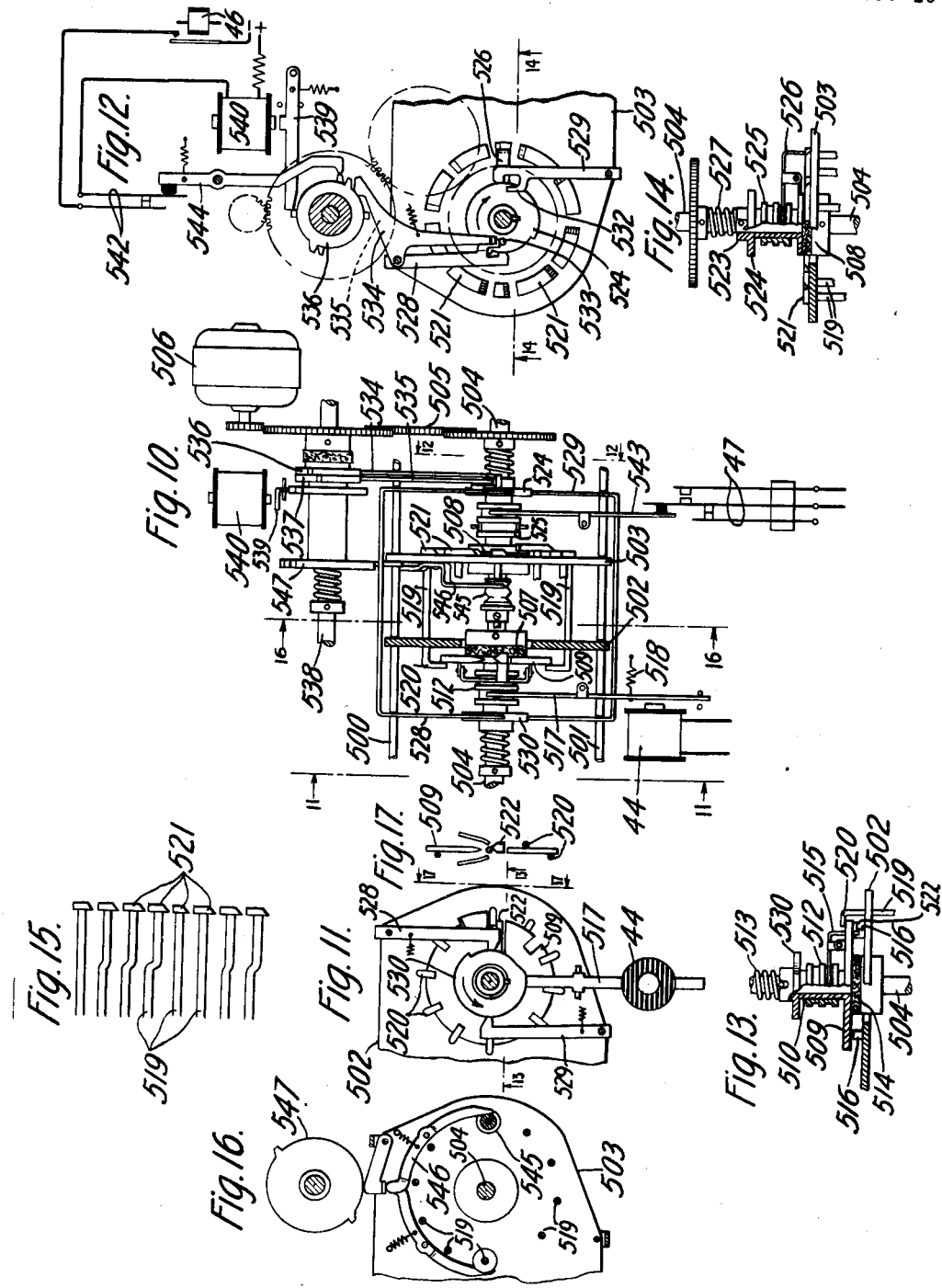

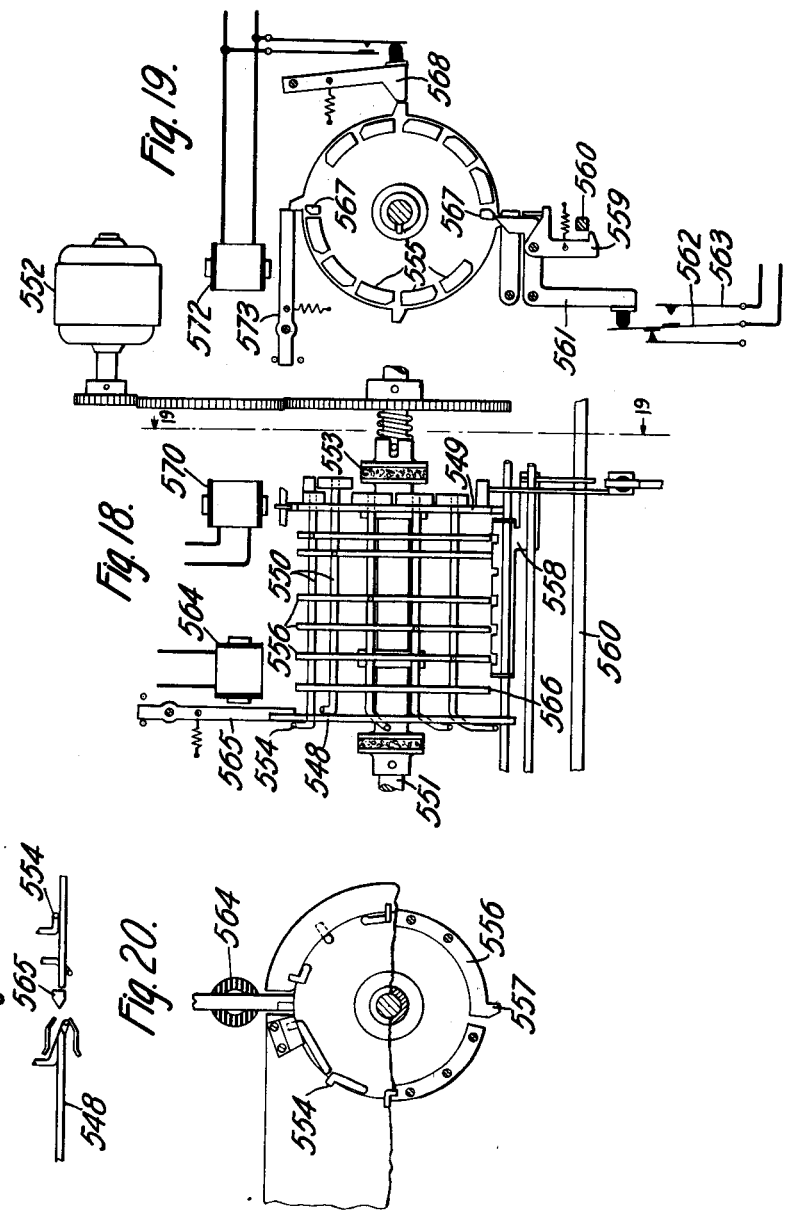

Patented Apr. 16, 1929.

1,708,954

UNITED STATES PATENT OFFICE.

LOUIS M. POTTS, OF TENAFLY, NEW JERSEY, ASSIGNOR TO WESTERN ELECTRIC COMPANY, INCORPORATED, OF NEW YORK, N. Y., A CORPORATION OF NEW YORK.

TRANSMISSION SYSTEM.

Application filed September 17, 1925. Serial No. 56,855.

This invention relates to systems for the transmission of intelligence, and more particularly to systems in which transmission is effected by varying or modifying the flow of electric currents.

It is an object of the invention to improve systems of this general character by increasing the speed of transmission, and by increasing the efficiency and serviceability thereof.

Another object of the invention is to enable a comparatively large number of channels over the same electrical transmission circuit.

A feature of the invention relates to the provision of means whereby the ordinary equipment employed in telephone exchange systems may be employed for the transmission of a large number of telegraph messages.

Another feature relates to a system in which a comparatively large number of outlying telegraph subscribers are enabled to transmit messages through the use of currents of relatively low frequency over telephone lines to a central office where said currents are translated by successively increasing frequencies into a single current of relatively high frequency, which is then transmitted over a telephone circuit to a distant central office where it is retranslated and separated into the several messages which it represents.

Another feature relates to a telegraph distributing mechanism which is capable of receiving a plurality of simultaneous messages each represented by code impulses of a low frequency, combining these into a number of groups each represented by currents of a higher frequency, repeating the combining operation and with each repetition decreasing the number of groups and increasing the frequency until all channels in which the individual messages originate are combined and represented by a single current of high frequency for transmission over the line.

Another feature relates to a distributing mechanism arranged to receive a large number of messages represented by code combinations of current which may be transmitted promiscuously with respect to each other and to distribute to a single line in a definite order, which may be determined by the grouping of the channels in which said messages originate, current impulses representing all of the original messages.

Another feature of the invention relates to a distributing mechanism which is capable of receiving from a single line a succession of current impulses sent at a high rate and representing a large number of messages originally translated into a given code, and to distribute to a plurality of channels or subscribers' lines at a relatively low rate of transmission the various impulses representing the messages intended for each of the successive lines.

Another feature of the invention relates to an arrangement whereby a plurality of telegraph messages are combined and represented by a single current of high frequency which serves to modulate a carrier current, together with means for transmitting over a single telephone channel currents having frequecies within a desired band which are demodulated at the receiving end to give a current representing the transmitted messages, which is in turn separated by a distributor into the various messages which are thereupon distributed to the proper lines.

Another feature of the invention relates to a relay arrangement responsive to impulses delivered over a circuit at a given frequency to set up in another circuit impulses of a different frequency.

A still further feature relates to a telegraph distributor for use in a system of this character comprising an arrangement of thermionic relays.

Referring to the drawing, Figs. 1 to 6 when taken in order disclose the equipment pertaining to six originating lines, the outgoing distributor at a central office, an interoffice telephone transmission line, the incoming distributor located at a distant central office, and six receiving lines.

Fig. 1 shows schematically a start-stop storing translator pertaining to a single incoming line at the central office which is arranged with six similar start-stop translators to feed code impulses to the relay distributor shown. At the right of Fig. 1 is shown another portion of the central office distributor comprised of sets of polarized relays.

Fig. 2 at the right shows a further portion of the central office distributor consisting of a group of thermionic relays. At the left of Fig. 2 is shown a frequency changer consisting of thermionic relays.

Fig. 3 shows a telephone trunk interconnecting two central offices and arranged for the transmission of currents of ordinary telephone frequency and also of carrier frequencies.

Fig. 4 shows the incoming end of the line at the distant central office. At the left of Fig. 4 is shown a synchronizing circuit consisting of thermionic devices. At the right of this figure is shown a thermionic relay distributor.

Fig. 5 at the left shows a frequency changer made up of thermionic devices. At the right this figure shows another portion of the distributor consisting of polarized relays.

Fig. 6 illustrates a portion of the central office distributor consisting of ordinary relays and arranged to serve six outgoing telegraph subscribers' lines.

Figs. 7 and 7ª comprise a diagram showing the application of this invention to a telephone exchange network.

Fig. 8 is a diagram showing the manner in which the several subscribers' lines terminating in two telephone exchanges are grouped to secure the multiplex telegraph operation.

Fig. 9 illustrates one of the thermionic devices employed in the distributors.

Fig. 10 is a top plan view showing a portion of the start-stop translator employed for delivering start-stop impulses to the multiplex system.

Fig. 11 is an end view looking in the direction of the arrows 11—11 in Fig. 10.

Fig. 12 is an end view looking in the opposite direction of Fig. 10.

Fig. 13 is a detail showing one of the clutches.

Fig. 14 is a detail showing another of the clutches.

Fig. 15 shows the selecting rods and cams.

Fig. 16 is a detail taken along the line 16—16 of Fig. 10.

Fig. 17 is a detail showing the manner in which the selecting rods are positioned.

Fig. 18 is a top plan view showing a portion of the start-stop translator for delivering multiplex signals to the start-stop lines.

Fig. 19 is an end view taken along the line 19—19 of Fig. 18.

Fig. 20 is an end view looking in the other direction of Fig. 18.

Fig. 21 is a detail showing the manner in which the selecting rods are positioned.

*General description of the system.*

Figure 1:
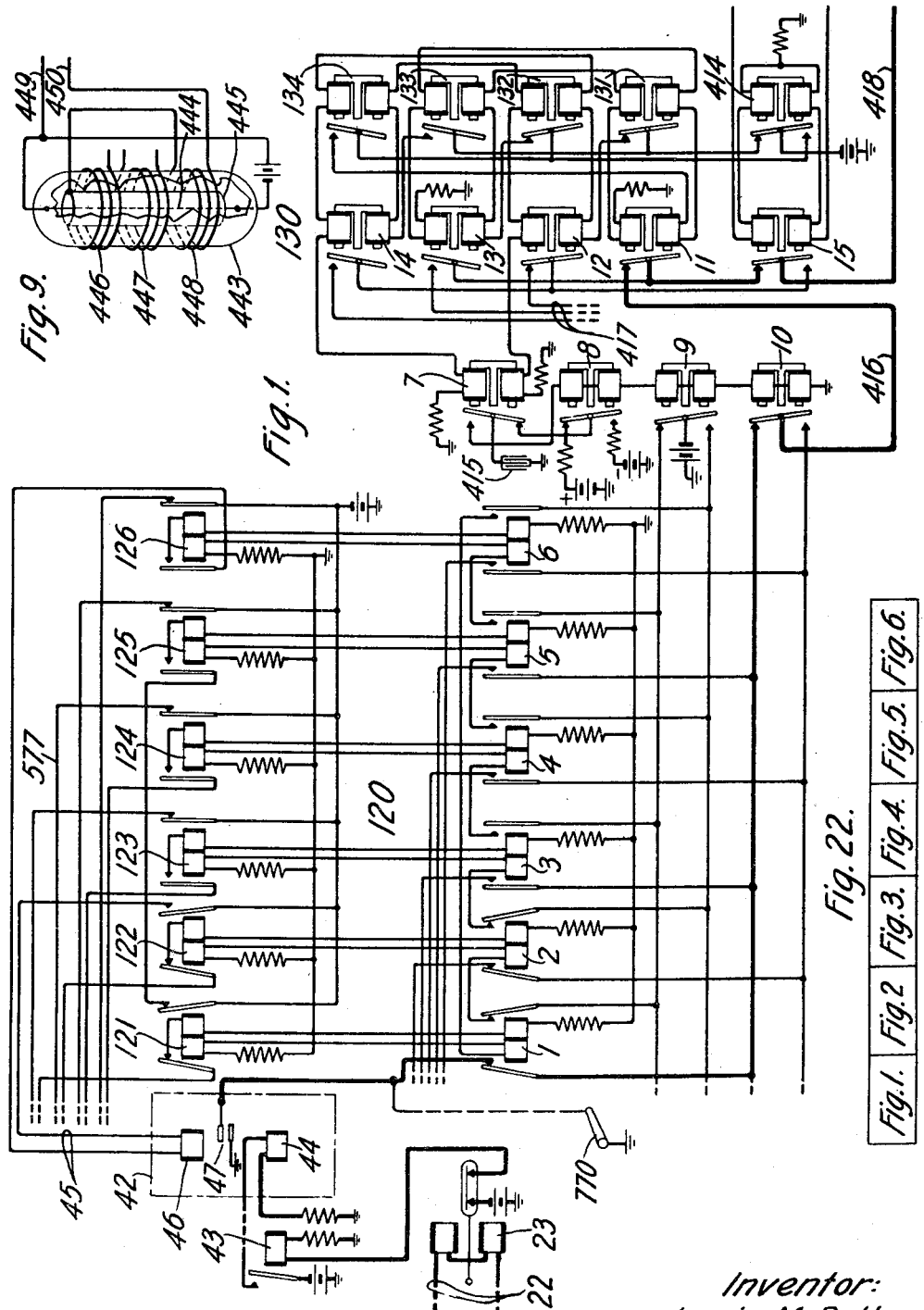

The multiplex telegraph system disclosed herein is designed particularly with the object in view of utilizing ordinary telephone equipment and circuits for the transmission of messages. It may be assumed, for example, that in a telephone exchange area many telephone subscribers will desire printing telegraph service as well. Each of these subscribers may have installed a printing telegraph equipment consisting of any well known type of sender and receiver which may at will be associated with the telephone line leading to the central office. Whenever the subscriber wishes to transmit a telegraph message, he calls the central office operator in the usual manner and requests connection to a distant office, which may be in some other city, through which access may be had to the particular line to which he wishes to transmit the message. In response to this request the operator, by the use of one of her cord circuits, extends the calling subscriber's line to a distributing equipment located in the central office and in turn connects, or causes to be connected, this distributing equipment to a trunk outgoing to the desired distant office. At the distant office the necessary information is given to the operator, who thereupon connects the trunk to an incoming distributing mechanism and in turn connects, or causes to be connected, the distributing mechanism to the desired outgoing subscriber's line. Thereupon, the calling telegraph subscriber may transmit the message by means of the keyboard. This message is received by the distributor at the first central office which distributes it in the proper sequential manner to the outgoing trunk over which it is transmitted to the distant office. At the distant office the message is received by the incoming distributor which, in turn, distributes it to the called telegraph substation where it is recorded on a printer or other suitable receiving device.

Referring particularly to the diagram of Figs. 7 and 7ª, there are shown two combined telephone and telegraph subscribers' stations, 700 and 707, which terminate in the first central office at the operator's position 732. These subscribers may, of course, converse with each other or with any of the other subscribers terminating in this office by means of their telephones 706 and 709, which are normally connected through keys or other switching devices to the respective lines 710 and 711. Moreover, if the subscriber at station 700 wishes to send a telegram to the subscriber at station 707, he calls up the central office and the operator thereat connects his line to the called subscriber's line by inserting one plug of her cord circuit 714 in the jack 712 of the calling line and the other plug in the jack 713 of the called line 711. As soon as the called subscriber is advised that a telegram is to be sent, he shifts his key to connect the line 711 directly to the telegraph equipment.

At each station there is provided a suitable device such as a buzzer 705 which operates in response to current received from the central office. This buzzer may be designed to vibrate at the rate of say 800 cycles per second, thus setting up in the line a current of a frequency which may readily be transmitted through the ordinary telephone equipment, this frequency being well within the voice range. Also at each subscriber's station there is provided a relay 704 which is designed to operate in response to alternating current of a given frequency for controlling the printer or other recording device.

The calling subscriber thereupon manipulates his keyboard whereby a sending contact, such as the contact 703, completes a circuit for the buzzer relay 705 in the proper manner to send the impulse codes representing the characters of the message. At the called station, a relay or other device 733 responds to these code impulses of alternating current to operate the telegraph receiving device 708, such as a printer.

If, on the other hand, the calling subscriber at station 700 wishes to send a message to a subscriber's station 731 appearing in a distant central office, it will be necessary for him to make use of a central office trunk. Upon receiving his request, the operator at the position 732 extends his line by means of his cord circuit over a connecting circuit, one end of which terminates in the jack 715 and the other end of which terminates in the outgoing distributor 716. Moreover, the distributor 716 is connected to the outgoing line 721 by means of a cord circuit 718, one plug of which is inserted in the jack 717 and the other in the jack 719. This cord circuit 718 may be at the position 732 or it may be located at another operator's position in the same exchange, or the outgoing distributor may be connected permanently to the outgoing end of the trunk 721. The operator at the first exchange now instructs the operator at the distant exchange who extends the trunk 721 by means of the cord circuit 724 to the incoming distributor 726. This is accomplished by inserting one plug of the cord in the jack 722 and the other plug in the jack 725. Lastly, the distributor 726 is connected by means of a cord circuit 728, one plug of which is inserted in the jack 727 and the other in the jack 729, to the line 730 which has been called by the subscriber at station 700.

If desirable two main lines 721 may be used instead of one to decrease the possibility of interference between messages sent in opposite directions.

The calling subscriber now sets up the code combinations on his keyboard which are transmitted over the line 710 to the central office on the start-stop principle. These impulses being made up of 800 cycle alternating current, cause the operation of an alternating current relay 23 at the central office which operates the start-stop distributor 42 which receives and stores the code combinations. These code combinations, which are received and temporarily stored in the start-stop distributor, are fed into the synchronous multiplex distributor in their proper order together with similar combinations from a plurality of other incoming lines, and thereupon transmitted over the interoffice trunk 721 to the distant office. At the distant office they are received by the synchronous multiplex distributor 726 and distributed in proper order to the start-stop distributors. The message being transmitted from the station 700 is received by the start-stop distributor 750 shown at the distant office and transmitted over the line 730 to the called station 731, where it operates a receiving device such as a printer 734.

It may be desirable to provide for two-way communication between subscribers' lines involving the multiplex apparatus. To this end, each central office is equipped with a plurality of receiving multiplex distributors 752, as well as a plurality of sending distributors 716. Likewise, the terminating office is equipped with a plurality of sending distributors 753, as well as the receiving distributors 726. A pair of distributors including a sending distributor 716 and a receiving distributor 752 may be provided with a half-repeater, including the relays 23, 43, etc., whereby signals transmitted from the substation 700 to the substation 734 are repeated to the multiplex distributor 716; whereas signals transmitted from the station 734 to the line 700 are distributed by the distributor 752 to the called line, all without interference. Likewise, at the distant terminal, signals coming from the station 700 are distributed by the distributor 726 and by means of a half-repeater delivered to the called station 734. When the station 734 desires to communicate, the distributor 753 receives the signals and transmits them to the central office at the distant end. This provision is made in order that two subscribers may communicate with each other without establishing successive connections.

For the purpose of establishing a connection in order that the called station 731 may communicate with the calling station 700, the operators at the central offices employ the cord circuits 761 and 763.

In order that a more tangible conception may be had of a system of this character, certain assumptions will be made regarding the number of subscribers' lines involved, the number of channels that may be combined in a single transmission line, also with respect to the speed of transmission. For example, it may be considered that the outgoing or sending end of the system may be made up of 96 different telegraph subscribers' stations each constituting a separate channel for communication, and that at the incoming or receiving end of the system there are 96 called telegraph lines with provision whereby each of the 96 calling lines may send messages simultaneously to respective ones of the 96 called lines, all over a single transmission circuit.

Referring particularly to the diagram in Fig. 8, 96 calling subscribers' lines 800 may appear in jacks at the operators' switchboards in the first central office. Also appearing in the operators' switchboards are the jacks of 96 different telegraph channels 801. By means of cord circuits 802, 803, 804, etc., the operators may connect any of the 96 subscribers' lines to any one of the 96 different channels.

Each individual calling line may transmit telegraphic messages by means of code combinations of current sent at a relatively low frequency. For this purpose, sending current of the order of 10 or 20 cycles per second may be employed. These character code combinations are transmitted by start-stop apparatus from the subscriber's station to the central office.

In order to secure multiplex operation at the central office, the 96 channels 801 are divided into 16 different groups of 6 channels each. For instance, the first 6 channels 805 constitute one group and terminate in a single low speed distributing mechanism 810. The second, third, and fourth groups of channels 806, 807 and 808 terminate, respectively, in individual low speed distributors 811, 812 and 813. In a similar manner, the remaining 12 groups of 6 channels each are assigned to individual low speed distributing equipments. Each of these low speed distributors, such as the distributor 810 which is shown in detail in Fig. 1, consists of a plurality of relays.

Each of the six incoming channels terminates in a translator unit. The signals may be transmitted from the subscriber's station to the central office by the usual seven-unit start-stop signals comprising five current impulses and a start and a stop impulse. The translator unit receives and stores these signals. It delivers them to the low speed distributor 810 in the proper order and in the proper phase position.

By means of the distributor 810, the signals in all of the first 6 channels 805 are directed over a single channel 815, which leads to a second distributing unit 814 of relatively higher frequency. The current in the channel 815, which represents the message signals in all 6 channels 805, is of a greater frequency than the original sending current and may be of the order of 60 cycles per second. In a similar manner, the signals in the second, third and fourth groups of channels 806, 807 and 808 are combined and directed over the respective single channels 816, 817 and 818 at 60 cycles per second. In a similar manner, the signals in each of the succeeding groups of channels are combined and directed over a less number of channels to the distributing elements 819, 820 and 821.

Thus the message signals in the 96 channels which originate by means of current of frequency of 10 cycles per second, are combined in the first stage distributing mechanisms into 16 different groups each represented by a current of 60 cycles per second. These 16 groups of channels are then directed to four distributing mechanisms 814, 819 and 821 as explained.

Figure 2:
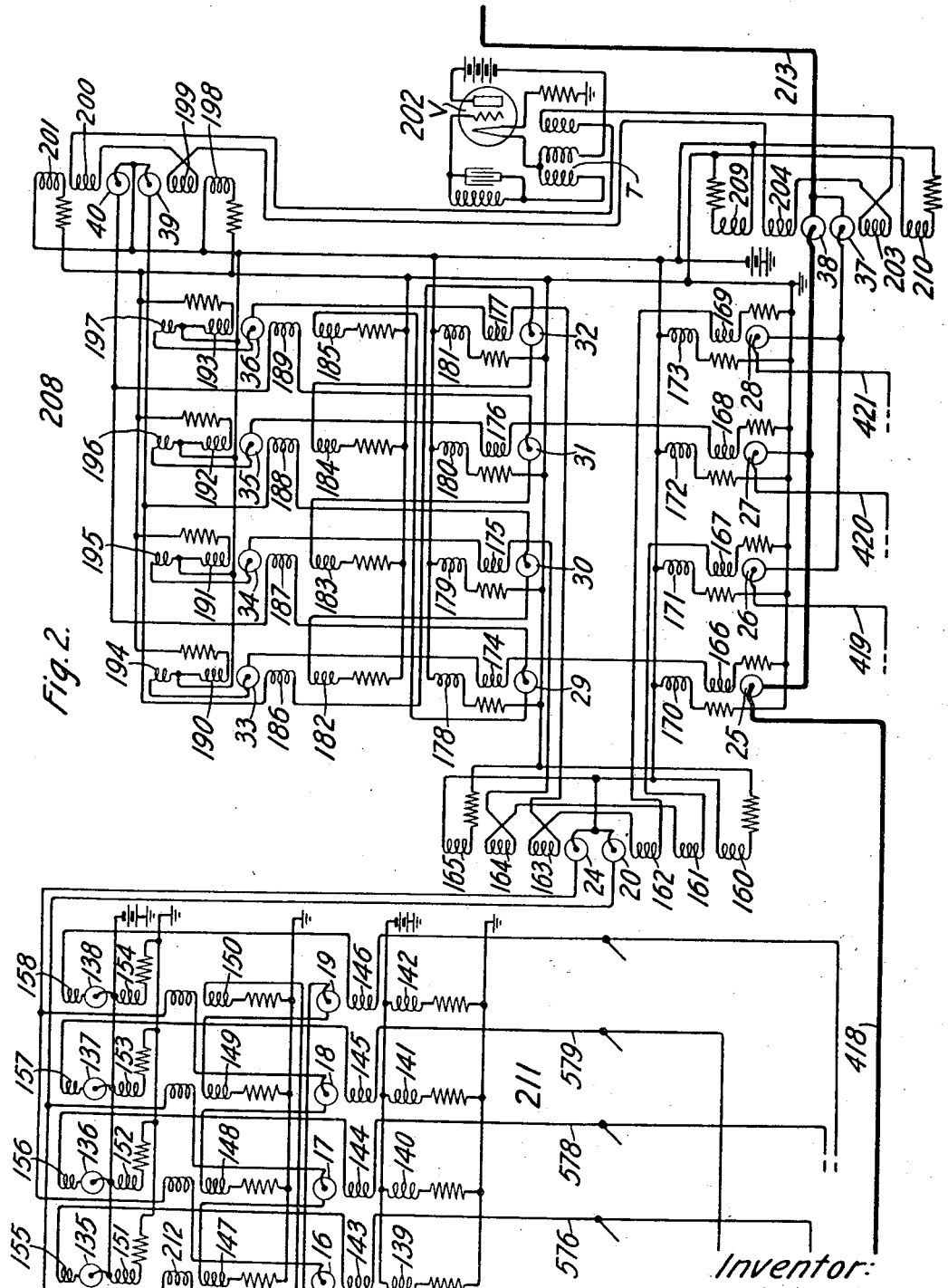

The distributor 814, for example, which is shown in detail at the right of Fig. 1, consists of a plurality of polarized relays. The function of this distributor is to receive the signals transmitted over the channels 815, 816, 817 and 818 by means of 60 cycle current, and to combine these signals and redistribute them over the single channel 822 by means of a current having a still higher frequency, such as 240 cycles per second. Similarly, the distributors 819, 820 and 821 combine the signals in four different channels and transmit them over the single respective channels 823, 824 and 825 by means of 240 cycle current to a single distributing mechanism 826. The distributing mechanism 826, which is shown in detail at the right of Fig. 2, consists of a plurality of thermionic or vacuum tube relays and its function is to combine the signals in each of the four channels 822, 823, 824 and 825, incoming at 240 cycles per second, into a single channel 827 by means of a current of still higher frequency such as 960 cycles per second.

Thus the signals incoming over 96 different lines simultaneously, originating at a relatively low frequency of sending, are combined by means of the distributing apparatus shown and transmitted over the line 827 at a comparatively high frequency.

A better understanding of the manner in which these signals are combined will be had after considering the detailed description of the apparatus given hereinafter. For the present it may be explained, however, that assuming the Baudot or five-unit code as the method of transmitting messages, the distributing apparatus is so arranged that if the first code interval applies to line No. 1, then the second code interval or transmission interval over the line 827 will apply to line No. 7, the third interval to line No. 13, the fourth interval to line No. 19, and so on, the sixteenth interval to line No. 91, and then repeating the seventeenth interval to line No. 2, and so on until the ninety-sixth interval is applied to line No. 96. Thus the first 96 intervals for transmission over the line 827 account for the first unit of the five-unit code in each of the 96 channels. Repeating this cycle of operations, the remaining four units of the character are accounted for in the four succeeding transmission groups of 96 intervals each.

At the distant central office the called telegraph subscribers' lines 829 terminate, of which they may, for example, be 96. There are also 96 channels 830 at the distant central office arranged in 16 groups of 6 channels each. The first four groups 831, 832, 833 and 834 appear in individual distributing mechanisms 835, 836, 837, and 838. Similarly, the remaining groups appear in other individual distributing devices. The distributing device 835, for instance, consists of a plurality of simple relays such as shown in Fig. 6 and serves to distribute the message signals for the first 6 channels to start-stop translators.

The operator, by means of cord circuits 839, 840, 841, etc., may connect any of the called telegraph lines to any one of the 96 channels. Thus the signals received by the distributing mechanisms, 835, 836, 837, etc., are distributed over the proper individual channels to ordinary start-stop distributors, which in turn function with the start-stop distributors at the called telegraph stations to cause the operation of printers or other recording devices.

The slow frequency distributing mechanisms 835, 836, 837, etc., are each connected by a single channel 842, 843, 844 and 845 to the distributor 846 which operates at a higher frequency. Likewise, the remaining three groups of low frequency distributors are connected over single channels to the three distributors, respectively, 847, 848 and 849. These four distributors 846, 847, 848 and 849 are connected by single channels each to the single distributing device 850 which operates at a still greater speed.

Thus the signals received over the line 827 by means of a current of 960 cycle frequency are divided into four groups by the distributor 850 and sent over the four channels 851, 852, 853 and 854 by means of current of 240 cycles frequency to the distributors 846, 847, 848 and 849. Each of these latter distributors, such as the distributor 846, further subdivides the signals received and directs them over four separate paths 842, 843, 844 and 845 by means of 60 cycles frequency to the distributers 835, 836, 837, and 838. Finally, each of these latter distributors, such as the distributor 835, divides the signals received and directs them over the 6 different channels by means of a current having a frequency of 10 cycles per second.

These ten-cycle frequency currents operate the translator at the central office. The signals are stored in the translator and are retransmitted in the form of standard seven-unit start-stop code signals to the subscriber's station where they are recorded in the well known manner.

Inasmuch as 96 different messages may be sent over a single transmission line 827 at the same time, it becomes necessary to preserve a systematic and orderly assignment of the 96 different channels at the outgoing and incoming ends. This is taken care of by the operators at the distant central offices who may communicate with each other in any suitable way, such as by the usual order wire which exists as a part of the regular telephone equipment. For instance, if a calling subscriber 855 desires to send a telegram to a called subscriber 856, the operators may assign the first channel for this purpose. In this case, one of the cord circuits 802 is inserted in the jack of the calling station 855 and the other plug inserted in the jack 857 relating to the first channel. At the distant central office the operator inserts one of the plugs of her cord circuit 839 in the jack 858 of the first channel and the other plug she inserts in the jack 859 of the called telegraph subscriber's line 856. In this manner, 95 other calling and called stations may be assigned to the remaining 95 channels.

Any number of multiplex lines of this kind may be connected in series through an ordinary telephone switchboard to provide a long distance circuit. The only condition necessary for such a connection is that all of the multiplex channels, regardless of the multiplicity, shall operate between two limiting speeds, for example, 40 and 41 words per minute. All substation transmitters should be so adjusted that they can not transmit over a certain limit, as, for example, 39 1/2 words per minute, and all receivers so adjusted that they will receive up to a given limit, as for example, at least 42 words per minute.

Referring to Figs. 1 to 6 inclusive, a brief description will now be given of the apparatus. At the left of Fig. 1 is shown the incoming end of the first channel 22. The circuit 22 leads to an alternating current relay 23 which is designed to maintain its contacts normally closed and responds to current of a given frequency, such as 800 cycles per second, to open and hold open its contacts during the time that current is flowing. Associated with the channel 22 is a start-stop translating mechanism 42 which, for the sake of convenience, has been illustrated schematically. This start-stop mechanism includes a signal-receiving relay 43 which responds in the usual manner to open circuit conditions to cause the distributor 42, by means of the receiving magnet 44, to set up by mechanical combination means, combinations representing the characters received. The start-stop translator 42 is associated with the relay distributor 120 by means of the circuit 45, which includes the start magnet 46 of the start-stop translator. The circuit 45 is so connected to the distributor 120 that the magnet 46 is operated at a given point in the cycle of operation of the distributor 120 in order to start the start-stop translator at the proper instant. Similarly, five other channels are connected to the translator 120 at five different points. By this arrangement the 6 start-stop translators representing the 6 channels associated with the distributor 120 are started in operation in a definite sequential order under the control of the distributor 120, each beginning to operate at a different point in the cycle of operation of the distributor 120. Hence the signals stored in the distributors 42 are fed into the distributor 120 in a definite sequential order. This same arrangement is provided for each of the remaining 15 groups of channels. The signals from the start-stop distributor 42 are delivered to the relay distributor 120 by means of the usual sending contact 47 which is operated in the well known manner by the storing means of the start-stop translator.

The distributor 120 consists of twelve counting relays 1 to 6 inclusive, and 121 to 126 inclusive. These relays are arranged to operate in pairs and lock, each pair causing the release of a preceding pair. The operating circuits are closed by the polarized relay 9. Relay 9 is in turn operated by relay 7, which is operated periodically by the distributor 130.

The distributing mechanism 130 consists of four pairs of polarized relays 11, 12, 13, 14, 131, 132, 133 and 134, together with an operating relay 414 and a distributing relay 15. The relays 7, 8, 9 and 10, which are also polarized, serve to interconnect the distributing mechanisms 120 and 130. These relays, together with the other polarized relays shown in other parts of the disclosure, are so arranged that the armature always stays in the position in which it was last attracted; one winding serves to attract the armature in one direction, whereas the other winding serves to attract it in the opposite direction. The four pairs of relays 11, 131, and 12, 132 and 13, 133 and 14, 134 are arranged in counting relation to be operated from the contacts of relay 414.

Assume relays 11 and 131 and relays 12 and 132 are operated and the other relays of the selector are unoperated. Relays 13 and 133 operate and relays 11 and 131 release on the next step, and on the next succeeding step relays 14 and 134 operate and relays 12 and 132 release. This process continues as long as relay 114 receives impulses.

The relay 7 is arranged to operate through its lower winding whenever the second pair of relays 12 and 132 are energized, and through its upper winding whenever the fourth pair 14 and 134 are energized. In other words, the relay 7 operates once in each direction for every cycle of the counting relays 130. Relay 7 on closing its lower contact, charges the condenser 415 either with a positive or a negative charge depending upon the position of the armature of relay 8. When relay 7 next closes its upper contact, the condenser discharges through the windings of relays 8, 9 and 10, serving to operate these relays to their other position.

Relay 8 operates in one direction during one cycle of the distributor 130, and in the other direction for the next succeeding cycle.

The relay 9 on each operation causes an operating circuit for a pair of counting relays of the distributor 120. Thus it will be seen that the rate of operation of the counting relays 120 is reduced as compared with the rate at which the counting relays 130 are operated.

Thus, for each cycle of operation of distributor 130, distributor 120 is operated one step and distributor 130 must complete six cycles before distributor 120 completes one cycle.

All of the code impulses representing messages in the six channels leading to distributor 120 are directed through contacts of the relay 10, over conductor 416, to the contact of relay 11. In a similar manner, the impulses for four other groups of six lines each are directed over conductors 417 to the contacts of relays 12, 13 and 14, respectively. The armatures of these relays 11, 12, 13 and 14 are connected to contacts of the relay 15, whereby all impulses representing the messages in four different groups may be directed to the single conductor 418.

The last stage of the distributor consists of a distributing mechanism 208 which is made up of a plurality of sets of thermionic relays. These relays, which will be described in detail hereinafter, consist of vacuum tubes each having a filamentary cathode and an anode which are very sensitive and accordingly may be operated at a high rate of speed. The thermionic relays are arranged in a counting relation similar to the relays shown in Fig. 1 and are operated cyclically by alternating current generated by an oscillation generator 202. The generator 202 consists of an ordinary three-electrode vacuum tube V which supplies space current to the middle winding of the induction coil T. The left winding of the coil supplies current to the input side of the tube, the frequency of which may be adjusted by the inductance and capacitance shown in the input circuit. The right winding of the coil T is included in series with the operating windings 200, 199, 204 and 203 of the relays 40, 39, 38 and 37, respectively.

The operating windings of these relays are so arranged that when current flows in one direction during a half cycle the relay will operate, and when it flows in the opposite direction the relay will release. By operation and release it is meant that the relay permits current to flow across the space between the cathode and anode for operation, and prevents current from flowing during the release period. As will be more fully explained hereinafter, in order that the relay may normally be released, a biasing or polarizing winding is supplied which is constantly energized. The relays 39 and 40 have their operating windings reversed whereby, when current is flowing in a given direction, one relay will be closed and the other relay open. Similarly, the relays 37 and 38 are arranged to operate and release alternately. The polarizing windings 201, 198, 209 and 210 are shown associated with their respective relays.

The relays of the distributor 208 are arranged in four sets, each set constituting a vertical row. That is, the relays 33, 29 and 25 constitute the first set; relays 34, 30 and 26 the second set; and so on. Relay 33 is provided with a polarizing winding 190, an operating winding 186, a release winding 182, and a locking winding 194. In like manner, the relays 34, 35 and 36 are similarly provided. Relay 29 has an operating winding 174 and a polarizing winding 178. The same is true of relays 30, 31 and 32. Likewise, the relay 25 is provided only with an operating winding 166 and a polarizing winding 170, which is also true of the relays 26, 27 and 28. For each closure of the relays 39 and 40, the succeeding one of the relays 33, 34, 35 and 36 is operated. The operated relay locks through its locking winding, causing the operation of the two associated relays in the same set. Also, at the time one of the relays 33, 34, etc., is operated, the second preceding relay which has been previously operated is released. This rotating action continues under the control of the oscillation generator 202.

Since the rate of operation of the distributor 208 is considerably higher than what is required for the distributor 130, a frequency changer 211 is inserted to reduce the speed of operation of the distributor 130. The changer 211 consists of four pairs of thermionic relays. The relay 135 is provided with an operating winding 212, a polarizing winding 151, a locking winding 155, and a release winding 147. The same is true of the remaining three relays 136, 137 and 138. The relay 16 has only an operating winding 143 and a polarizing winding 139, and this is also true of the relays 17, 18 and 19.

Interacting between the high speed distributor 208 and the frequency changer 211 is a device consisting of two thermionic relays 20 and 24, each of which has a polarizing winding, an operating winding, and a release winding. The relays 20 and 24 are so connected to the distributor 208 that one relay operates and the other releases when relay 34 closes. When relay 36 closes, the reverse action takes place with relays 20 and 24. Thus the relays 20 and 24 each operate and release for each rotation of the distributor 208. Relays 20 and 24 govern the counting operation of the relays of the frequency changer 211. These relays 211 determine the operation of the polarized control relays 15 and 414.

As the distributor 208 rotates under the control of the oscillator 202, the relays 25, 26, 27 and 28 are sequentially closed and opened at a definite rate per second. During the closed period of relay 25, all message impulses on the conductor 418 are delivered through the relay 38 to the single path 213. Similarly, during the closed periods of relays 26, 27 and 28, all message impulses flowing in the conductors 419, 420 and 421 are delivered through relays 26, 27 and 28 and either through the relay 37 or the relay 38 to the single path 213.

The path 213 is connected to the transmission line 226 by means of a connecting or cord circuit 206, the plugs of which are inserted in jacks 205 and 207. At the distant central office, the transmission line 226 is connected with the path 253 by means of the connecting circuit 231, the plugs of which are inserted in jacks 230 and 232.

The transmission line 226 may be of the well known character used for multiplex carrier telephone transmission. Accordingly, there is provided at the outgoing end, an oscillation generator 221 for generating a high frequency carrier current suitable for transmission over the line 226. A modulator 220 of any well known type, such as the vacuum tube modulator, is employed for modulating the high frequency carrier current 221 in accordance with the telegraph signals received over the path 213 from the distributor 208. The modulated carrier current may then be amplified by an amplifier 222 of any well known design and pass through a high-pass band filter 223 to the transmission line 226.

At the receiving or distant station the high frequency modulated carrier current is passed by the high-pass band filter 227 to the demodulator 228. The demodulator 228, which may also be of any well known construction, demodulates the carrier current and delivers the detected telegraph signals to the amplifier 229. These signals are amplified by the amplifier 229 and then delivered to the single transmitting path 253 leading to the distributing mechanism in the incoming office.

If desirable, the transmission line 226 may also be arranged to transmit ordinary voice frequency telephone currents without interference. This is accomplished by employing low-pass band filters 224 and 233. These filters are designed to pass the comparatively low frequency voice currents but to exclude the high frequency carrier telegraph currents. By making suitable connection with the jacks 225 and 234, ordinary telephone conversations may be held over the transmission line 226.

At the receiving office, the distributors 422, 423 and 424 are similar in function to those shown at the sending office and serve to receive the signals on all 96 different channels and distribute them to the corresponding called telegraph subscribers' lines.

The distributor 422, which operates at high speed, corresponds to the distributor 208 at the sending end and is made up of a plurality of sets of thermionic relays. However, instead of having four sets of relays as in the case of distributor 208, the distributor 422 is provided with eight sets, these sets occurring in vertical rows. The reason for having eight sets instead of four is to facilitate the maintenance of synchronism between the equipment at the sending end and at the receiving end. The relay distributor 422 is driven by an oscillation generator 252 which comprises a vacuum tube X having input and output circuits associated with the inductance Y, together with an inductance and capacity in the input circuit for securing the desired frequency. It is found that synchronism may be maintained conveniently by driving the oscillator 252 at a frequency which is double the frequency of the oscillation generator at the sending end. Accordingly, twice the number of such relays are needed for the distributor 422 in order that the frequency changer 425 may be driven at half the speed of the distributor 422, or, in other words, at a speed equal to the speed of sending at the transmitting station.

The first set of relays in the distributor 422 consists of relays 340, 260, 73, 72 and 80. Similarly, the third, fifth and seventh sets of relays consist of an equal number each. The second set of relays, however, consists of only three, namely, the relays 341, 60 and 81. In like manner, the fourth, sixth, and eighth sets each have three relays. The relay 340 has an operating winding 332, a polarizing winding 348, a release winding 324, and a locking winding 316. The same is true with respect to each of the relays 341, 342, 343, 344, 345, 346 and 347. Relays 260 and 73 are each provided with an operating winding 308 and 304, respectively. The same is true of relays 60, 261, 61, 262, 62, 263, 63, 75, 77, 79, 72, 74, 76 and 78. Although the polarizing windings are not shown for several of these latter mentioned relays it is to be understood that these windings will be provided to maintain the relays normally open.

The distributor 422 is driven by the oscillator 252 under control of the thermionic relays 69 and 68. Upon the occurrence of an oscillation in the output circuit of the generator 252 one of the relays, 69 for instance, is closed and the other relay 68 is held open. Upon the next oscillation, the reverse process takes place, namely, the relay 69 is opened and the relay 68 is closed. This continues, the relays alternating throughout each successive cycle of the current produced by the generator 252. Upon each closure of each of the relays 68 and 69, a succeeding one of the relays 340, 341, 342, etc., is operated and a second preceding relay is released. Therefore, it will be noted that one of these relays operates for each half-cycle of the current produced by the generator 252. It will also be noted that the relays 73, 75, 77 and 79 and also relays 72, 74, 76 and 78 are operated at the rate of one relay per cycle of the oscillatory current. Also included in the output circuit of the generator 252 is a relay 67, which responds to current in a given direction once per cycle and accordingly is closed once during each cycle of the current. The relay 67 supplies current through one or the other of the relays 65 and 66, which latter relays are operated in response to incoming signals, as will be explained hereinafter, for determining the operation of one or the other of each of the pairs of relays 80 and 81, 82 and 83, 84 and 85, 86 and 87. Relays 80 and 81, when operated, complete a circuit through the winding of the polarized relay 94 to determine its operation in one direction or the other according to which of the two relays was closed. Relay 94 determines the application of plus or minus battery to a signaling circuit. In similar manner, the remaining three pairs of relays 82 and 83, 84 and 85, etc., determine the operation of three other relays similar to the relay 94.

The second portion of the distributor 423 consists of four pairs of polarized relays 98 and 398, 99 and 399, 100 and 400, and 101 and 401, together with four polarized relays 102, 103, 104 and 105. The relays 98, 398, etc., are operated in sequential fashion by means of the frequency changer 425. The frequency changer 425 is made up of four sets of thermionic relays which are driven in a cyclical manner by means of the two relays 88 and 89. The relays 88 and 89 have their operating and releasing windings connected to two different points in the distributor 422. Thus for each rotation of the distributor 422, relays 88 and 89 are each operated to determine the sequential operation of the relays of the frequency changer 425. The frequency changer 425 has two of its relays 380 and 382 connected to windings of polarized relays 95 and 96. By this means the relays 95 and 96 are operated once in each direction for each rotation of the frequency changer 425.

The relays 102, 103, 104 and 105 are selected sequentially, however, by the counting operation of the relays 98, 398, etc., and are operated in either one or the other direction by circuits closed through the contacts of relays 94 and 95, according to whether there are signals in the conductors 426 or 427. The relay 102, when operated in either one or the other direction, applies either positive or negative current to the conductor 429. The signals thus produced in the conductor 429 are directed through one or the other of the contacts 106 to the contacts of the relays of the distributor 424. In a similar manner, the relays 103, 104 and 105 receive signals from contacts of relay 94 and in turn apply plus or minus battery to the conductors 430, each of which leads to the armature of a relay similar to relay 106 associated with three distributing mechanisms similar to the mechanism 424.

The distributing device 424, similar to the distributor 120 at the sending station, consists of six pairs of simple relays. These relays are arranged in counting relation to each other and are operated and released sequentially at a given rate which is a part of the rate of rotation of the relays of the distributor 422. For operating the relays 424 in sequential manner, polarized relays 107, 180 and 181 are provided. The relay 107 operates to close its upper and lower contacts once for each rotation of the distributor 423. On closing its lower contact, the relay 107 permits the condenser 431 to charge either positively or negatively according to the position of relay 180. On subsequently closing its upper contact, relay 107 closes an operating circuit for relays 180, 181 and 106 which operate in a direction depending upon the nature of the charge which the condenser 431 discharges through their windings. For each operation of relay 181 in either direction, a pair of the counting relays 108, 408 and 109, 409, etc., are energized and a preceding pair are released.

The signals occurring in the conductor 429 are directed through contacts of relay 106 to the closed contacts of relays 108, 109, 110, etc. Whenever marking signals are present in conductor 429 at the time relay 106 closes its upper contact and relay 108 is operated, these signals are directed over the path 432 to the windings of the polarized relay 114. Relay 114 completes a circuit through the windings of polarized relays 115 and 116 and through the code magnet 433 of the start-stop translator associated with the channel identified by the relay 108. Likewise, the signals intended for the following five channels are directed through contacts of the relays 109, 110, etc., to the respective conductors 434.

In order that synchronism may be maintained between the sending and receiving ends, means is provided for adjusting automatically the speed of the oscillator 252 whenever it varies from the frequency established by the oscillator 202 at the transmitting station. For this purpose, the thermionic relays 239 and 238 have their operating windings 246 and 247 included in series with the output circuit of the oscillator 252. Accordingly, these relays will both be operated once for each cycle of the oscillatory current 252.

The signals, after detection and amplification, delivered to the conductor 253, are directed to the operating windings of the thermionic relays 135 and 136. The relay 435 is so arranged that the polarizing and operating windings both act in the same direction. The polarizing winding is adjusted so that it almost opens the relay normally. Thus when a slight current is flowing through the operating winding, the relay will open. Conversely, the operating and polarizing windings of the relay 436 are in opposition to each other and the polarizing winding is adjusted so that it is just strong enough to hold the relay open. Accordingly, a small amount of current through the operating winding will close the relay. Accordingly, whenever a signal occurs in the conductor 253, the relay 435 opens and relay 436 closes. In this condition, current flows through the left winding of the transformer 235 in a given direction. Following the signal when an absence of current occurs, relay 436 opens and relay 435 closes. This reverses the direction of the current through the winding of the transformer 235. Thus for each signaling current impulse, there is a reversal of the direction through the left-hand winding of the transformer 235. Accordingly, an alternating current is induced in the right-hand winding of the transformer, the direction of which alternates through the operating windings 242 and 243 of the thermionic relays 236 and 237. This current is composed of short pulses separated by much longer intervals of no current.

The frequency of the current produced by the oscillator 252 is just twice as great as the frequency of the incoming signals from the transmitting station. Accordingly the relays 238 and 239 will open and close at twice the rate of the relays 236 and 237. These relays are adjusted in such manner that when the transmitting and receiving stations are in synchronism the closed period for each of the relays 236 and 237 occurs between the closed periods of the relays 238 and 239.

When condenser 438 is out of the circuit, the frequency of the oscillator is slightly greater than that of the incoming signals; and when the condenser is in the circuit, the frequency of the oscillator is slightly less than that of the incoming signals. While switching condenser 438 in and out at rapidly recurring intervals, the intervals may be so regulated in lengths that the average frequency of the oscillator will be exactly the same as that to the incoming signals. The relays 236 and 237 close for very short intervals for each reversal of the current in line 253. This short impulse is delivered by relay 238 or 239 into the winding 250 or 251 of relay 240, depending upon the phase of the oscillator with respect to the incoming signals. For a certain interval pulses will go through relay 238 and for a certain interval through relay 239, and condenser 438 will be in and out of the circuit accordingly. If any factor affects the rate of the incoming signals or the rate of the oscillator, the relative length of the two sets of intervals will automatically readjust itself to maintain synchronism. By this means only is the average frequency of the oscillator the same as that of the signals, to maintain a substantially fixed phase relation.

In order that a better understanding may be had of the coöperation between the different stages of distributors, certain assumptions will now be made regarding the speed at which these mechanisms are driven. Assume that the oscillation generator 202 generates alternating current having a frequency of 960 cycles per second. This means that the direction of the current changes twice during each cycle, or 1920 times per second. Accordingly, the control relays 39 and 40 each close once and open once during each cycle, giving 1920 closures per second. Since one of the relays 33, 34, 35 and 36 operates for each operation of one of the relays 39 and 40, the relays 33, 34, 35, etc., of the distributor 208 will operate at the rate of one relay in each 1/1920th of a second.

The relays 20 and 24 are so connected to the distributor 208 that each of these relays operates and releases once during a complete cycle of the distributor 208, or, in other words, during each interval of 1/480th of a second. For each operation of the relays 20 and 24, a set of the relays of the frequency changer 211 is operated. Therefore, in order to operate all four of the sets of relays of the frequency changer 211, it will be necessary to operate each of the relays 20 and 24 twice. Accordingly, it requires 1/240th of a second to complete a cycle of the frequency changer 211.

The frequency changer 211 is so connected to the polarized relay 414 that this relay is operated once in each direction for a complete cycle of the changer 211, giving two operations of the relay 414 in 1/240th of a second. Since it is necessary for the relay 414 to operate four times to complete a cycle of the distributor 130, said distributor requires 1/120th of a second per cycle. Due to the manner in which the relay 7 is connected to the distributor 130, said relay operates once in each direction for each cycle of said distributor. Inasmuch as the relay 9 operates once for every two operations of the relay 7, it follows that each of the counting relays 1, 2, 3, 4, etc., of the distributor 120 requires two operations of the relay 7. Accordingly, for each cycle of the distributor 130, a pair of the counting relays 120 will be operated. This means that the distributor 120 requires 1/20th of a second per cycle.

From the foregoing assumptions, it will be seen that the start-stop distributors 42 associated with each of the 96 sending channels may be arranged to send other code impulses to the 16 different distributors 120 at the rate of 20 impulses per second. These impulses are delivered in the proper sequential order to four separate second-stage distributors 130 operating at a high rate of speed. The impulses from the four distributors 130 are delivered in proper sequential order over four separate conductors 418, 419, 420 and 421 to the single third-stage distributor 208, which operates at a still greater speed and distributes all impulses from 96 different channels in the proper sequential order to the input circuit of the modulator 220 in order to modulate the high frequency carrier current for transmission over the signal line 226.

If desirable, the speed of all four distributors 130 may be governed by the single frequency changer 211. This may be accomplished by multiplying each pair of leads from the changer 211 to separate distributors 130, the connection being taken off at the proper point to give the correct phase relation for each distributor.

At the receiving central office, it may be assumed that the oscillator 252 generates an alternating current at a frequency of 1920 cycles per second. Accordingly, the relays 68 and 69 operate and release once per cycle. This means that the relays of the distributor 422 operate at the rate of two relays per 1/1920th of a second. In other words, it requires 1/480th of a second for each cycle of the distributor 422.

The distributor 422 is so connected to the frequency changer 425 that two sets of relays of the changer 425 are operated for each cycle of the distributor 422. This means that the frequency changer 425 requires 1/240th of a second for each cycle. The changer 425 is in turn so connected to the polarized relay 96 that this relay performs an operation in each direction for each cycle of the changer 425. Accordingly, the distributor 423 requires 1/120th of a second for each cycle of operation.

Similar to the manner in which the relay 107 is connected to the distributor 423, this relay operates once in each direction for each cycle of said distributor and, accordingly, the final distributor 424 requires 1/20th of a second for each cycle.

It follows from these assumptions that the multiplex distributor apparatus at the receiving central office is capable of distributing code impulses to each of the 96 separate receiving channels at the rate of 20 impulses per second.

It will, of course, be understood that the assumptions made for the speed of operation of the equipment shown are arbitrary and that this equipment may be driven at higher or lower speeds according to the requirements.

At the receiving end of the multiplex system, a phasing arrangement is provided. This consists of the keys 440, 441 and 442, which in reality may be assembled to constitute a single key. The function of the phasing key is to arrest the operation of the distributors 422, 423 and 424 and cause these distributors to start in operation at a definite point in their cycles which will be exactly in synchronism with the rotation of the corresponding distributors at the transmitting station. A more detailed explanation will be given of the phasing operation hereinafter.

*Description of the thermionic relays.*

As already explained, certain of the distributing mechanisms are composed of thermionic relays. One of these relays is illustrated somewhat in detail in Fig. 9. It consists of an evacuated vessel 443 within which is enclosed a thermionic cathode 444 which may be heated by a suitable source of electric current. For convenience this heating source has not been shown throughout the drawing. Also within the vessel 443 and surrounding the cathode 444, is an anode 445 cylindrical in shape. This anode may comprise a solid metal cylinder or it may be made up of a cylindrical cage of spaced metallic members. Surrounding the glass vessel 443 are a number of coils 446, 447 and 448 designed to carry electric currents. If a potential difference is applied across the terminals 449 and 450 with the cathode heated, an electric current will flow due to the discharge of electrons into the evacuated space. By energizing one of the windings 446 with electric current of the proper value and in the proper direction, the stream of electrons flowing between the electrons may be so controlled and restricted that no current flows in the circuit 449, 450. By passing an electric current through a second one of the windings 447 as an operating winding in the proper direction, the polarizing effect of the first winding 446 may be overcome, whereby current again flows in the circuit 449, 450. Once the circuit is closed, it should be maintained in a closed condition by the flow of current through the locking winding 448. The effect of this locking winding is to counteract the polarizing winding 446, whereby the current flowing therethrough is sufficient to maintain the electron flow between the electrodes of the tube. For a further description of relays of this type, reference is made to the patent to A. W. Hull, No. 1,387,985, granted August 16, 1921.

*Detailed description of the start-stop distributors.*

A detailed description will now be given of the start-stop distributor which receives start-stop impulses from a subscriber's line and delivers them to the multiplex distributing mechanism. Referring to Figs. 10 to 17 inclusive, there is shown a stationary frame or cage consisting of rods 500 and 501 upon which are mounted the stationary plates 502 and 503. Extending through the center of the plates 502 and 503 is a shaft 504 which is constantly driven through a chain of gears 505 by a governed motor 506.

The shaft 504 carries two friction clutches 507 and 508. The clutch 507, better shown in Fig. 13, includes a plate 509 which is loosely journaled upon the shaft 504 by means of a sleeve portion 510. On the other end of the sleeve portion 510 there is formed integrally therewith a cam 530, the purpose of which will be explained later. Surrounding the sleeve 510 is a second sleeve 512 having two peripheral slots therein. The sleeve 512 is loosely mounted on the hub 510 for relative motion. A coil spring 513 presses the plate 509 against the friction material 514 which is rotating constantly with the shaft 504. In this manner, the tendency is to drive the plate 509 with the shaft. The plate is normally held from rotation by means of a bell crank lever 515 which is pivotally mounted on the plate 509 and has one arm engaging one of the slots in the sleeve 512. With the sleeve 512 in its normal position, the other arm of the bell crank lever 515 is rotated to a position where it encounters one of two stop pins 516 attached to the stationary plate 502. In this manner, the plate 509 is held from rotation.

Engaging the other slot in the sleeve 512 is the armature 517 of the receiving magnet 44. When no impulses are being received by the magnet 44, spring 518 holds the armature 517 in its retracted position, drawing the sleeve 512 to the left as seen in Fig. 10 and thereby positioning the lever 515 to encounter one of the stop pins 516. When a start impulse is received by the magnet 44, the sleeve 507 is drawn to the other position, allowing the lever 515 to disengage the stop pin whereby the plate 509 rotates through a half revolution with the shaft 504. During the rotation of the plate 509 through a half revolution, the code impulses may be received by the magnet in any number up to five, causing the successive movement of the sleeve 507 in accordance with the receipt of the impulses. The manner in which this sleeve causes the selecting rods to be positioned will be described presently.

The start-stop code impulses are stored for subsequent transmission through the multiplex system by means of two series of slidable rods. There are five of these rods 519 in each set, each set of five occupying one-half of a circumference about the shaft 504. The rods 519 are slidably mounted in the stationary plates 502 and 503 and each has one end bent to form a right angle portion 520. Each of the rods carries at its opposite end a camming member 521. The length of these cams is uniform with the exception of the cam attached to the fifth rod, which is seen to be considerably shorter than the other four. This is to enable the maintenance of the proper phase relation between the distributor and the multiplex unit.

The rods 519 are designed to be moved to either one of two positions with respect to the plate 502 by means of the beveled end 522 of the bell crank lever 515. (See Fig. 17.) To this end, the plates 509 have a slot or opening therein through which the beveled end 522 of the lever 515 passes as the lever is rotated by the power 512 under the influence of the magnet 44. Following the start impulse the plate 502 rotates to 180 degrees, bringing each of the bent ends 520 of the rods 519 successively into registration with the opening in said plate. Depending upon the position of the beveled end 522 at the instant any particular rod is brought in proximity with the opening in the plate 502, such rod is deflected by said beveled end either to one or to the other side of the plate. Accordingly, after a half revolution has been made, a set of rods is positioned to record the combination of impulses received by the magnet 44.

As will be seen later on, two sets of rods are provided in order that a signal received over the start-stop line may be stored momentarily, provided the distributor is not in the exact phase relation with respect to the multiplex for the immediate delivery of said signal to the multiplex distributor. Thus the transmission from the start-stop line is entirely independent of the phase relation of the multiplex apparatus.

The delivery of the signals from the start-stop distributor to the multiplex distributor necessarily depends upon two factors: first, there must be a signal stored in the start-stop distributor, and the multiplex distributor must have reached the proper phase relation before delivery can commence. For this purpose, clutch 508 is provided and is under the joint control of the start-stop distributor and the multiplex distributor. This clutch, which is shown in detail in Fig. 14, consists of a hub-shaped member 523 carrying an integral cam 524. Loosely fitted around the hub 523 is a sleeve 525 having two slots therein. A lever 526 pivoted to the hub 523 has one of its extremities projecting to arrive in one of the slots in the sleeve 525. The other end of the lever 526 describes a circumference coincident with the surface of the cams 521 on the slidable rods 519. Whenever one of these rods is projected forward, the cam extends to a position where it is encountered by the lever 526 during the rotation of the latter; whereas if the rod is in its normal position, the lever 526 does not engage the same at the end of said rod. The coil spring 527 urges the hub 523 against friction material which is constantly rotating with the shaft 504. Thus the tendency is for the shaft 504 to drive the hub 523 therewith. Said hub, however, is restrained normally from rotating by means of the levers 528 and 529. The lever 528 is U-shaped, one end of which engages the cam 524 on the hub 525. The other end of this lever engages the cam 530. In a similar manner, the lever 529 is U-shaped, one end engaging the cam 524 and the other the cam 530. The cam 530 is so shaped that when the plate 509 is in one of its two normal positions, one or the other of the levers 528 or 529 is permitted to tilt toward the center slightly, thereby bringing one end of such lever to a position where a projection 532 is caused to engage a stop pin 533 carried by the hub 523. Thus the lever 528 or 529, as the case may be, restrains the hub 523 from rotation, provided the cam 524 is also in its normal position. In other words, one of the levers 528 or 529 can only be tilted toward the center if both cams 530 and 524 are in normal positions.

In addition to the levers 528 and 529 for holding the hub 524 from rotation, there are provided two other levers 534 and 535, the first being slightly shorter than the second. Normally, both of these levers extend to a point where their ends are in alignment with the stop pin 533. The opposite ends of levers 534 and 535 cooperate with cams 536 and 537, respectively. These cams are loosely mounted on the shaft 538, and when released are driven through a friction clutch by the motor 506. Normally, the cams are held by a lever 539 controlled by the stop magnet 540.

As soon as the distributor has commenced to record a start-stop signal, the cam 530 rotates through a sufficient distance to elevate the particular lever 528 or 529 which has been holding the hub 523 from rotation. This removes the finger 532 from engagement with the stop pin 533, thus releasing the hub 523 which commences to rotate to the friction clutch driven by the shaft 504. The hub 523 no sooner commences rotation, however before the pin 533 engages the lever 535 and thereupon ceases to rotate. As soon thereafter as the multiplex distributor is in its right phase relation, the relay 46 is operated closing a circuit including the contacts 542 for the start magnet 540. The magnet 540 withdraws the lever 539, permitting the cams 527 and 536 to begin rotation. Cam 537 immediately rotates the lever 535 whereupon the hub 523 is again released and once more starts to rotate. It is immediately arrested, however, by the lever 534 but, since the cam 536 is now in abeyance, this lever is at once withdrawn, whereupon the hub 523 is free and may now rotate through a complete half revolution to transmit the signal which either has been recorded or is being recorded by the start-stop distributor. During the rotation of the hub 523, the lever 526 engages such of the cams 521 as have been pushed forward into its path by the selecting rods in accordance with the signal combination recorded.

The lever 526, therefore, moves the sleeve 525 forward whenever it encounters one of the cams 521. Engaging the other slot of the sleeve 525 is a lever 543 which actuates the sending contacts 47. Thus the sending contacts 47 are caused to open and close to transmit signals to the multiplex distributor 120 in accordance with the nature of the combination set up by the selecting rods 519.

When the hub 523 has completed a half revolution, it is arrested by one of the levers 528 or 529 provided the storing of another signal has in the meantime not reached the stage necessary to prevent one of these levers from rotating inwardly a sufficient distance to engage stop pin 523. A lever 544 is provided to maintain the contacts 542 closed only when the cams 536 and 537 have reached their normal position. As soon as the storing of the next signal has progressed to the proper position the hub 523 is again released and another rotation takes place to deliver this signal to the multiplex distributor 120.

Should any given signal involve the fifth selecting rod 519, the lever 526 after a half revolution has been made to send this signal, would stop on the fifth cam 521 and continue to send a marking impulse were some other provision not made to prevent it from doing so. To obviate this undesirable feature, the fifth rod in each set carries a slotted member 545. A lever 546 pivoted on the frame has one end extending into the slot 545 and another end controlled by the cam 547 which is mounted for rotation by the shaft 538. As soon as the cam 537 has left its normal position, the lever 546 rotates its end into the slot 545 and locks the fifth rod 519 in its operated position while the signal is being sent. As soon as the signal has been sent and a half revolution has been made, the cam 547 returns to normal, removing the lever 546 and unlocking the fifth rod. At this time the bent end 520 of said rod is opposite a slot in the plate 502, and thus the pressure of the contact springs 47 is sufficient to restore said rod to its normal position, thus preventing the sending of a marking impulse.

Next, a description will be given of the start-stop distributor used for delivering signals from the multiplex distributor, such as that shown in Fig. 6, to the called subscriber's line. This distributor consists of a rotatable cage comprising end plates 548 and 549 and two sets of slidable rods 550. The plates 566 and 549 are mounted for rotation with the shaft 551, which is driven by a governed motor 552 through a chain of gears and a friction clutch 553. The rods 550, of which there are five in each set, have one end bent to form an angle portion 554 and at the other end each of these rods carries a cam 555. Two sets of cams and rods are properly spaced to allow the maintenance of the necessary phase relation between the start-stop and multiplex equipments. In addition, each of the rods carries a circular disc 556 arranged to slide with the rod to which it is individual. Each of the discs 556 carries a projection 557 which registers with a notch in the plate 558 when the rod 550 is in its normal position. Thus when no impulses have been received, if the cage is rotated the projections 557 pass through the notches in the plate 558 without disturbing the same. Under these conditions the lever 559 is held in the position shown to hold the lever 561 in a position to maintain the contacts 562 and 563 open. To receive and store a signal combination from the multiplex system, the stop magnet 572 is energized when the multiplex distributor 424 reaches its proper position in its cycle. Magnet 572 operates its armature 573 to release the cage for rotation with the shaft 551. As the cage rotates, the magnet 564 is energized and deenergized in accordance with the code impulses to position its wedge-shaped armature 565 either to the one or the other side of an opening in the stationary plate 548. As the cage rotates, the bent ends 554 of the rods 550 are brought into engagement with the wedge-shaped armature 565 and are thus deflected either to the one or to the other side of the plate 548.

Just after the fifth impulse period has passed, the projections 557 on the rotating discs 556 which are out of registration with the slots in the plate 558, engage said plate and rotate the same to release the pawl 559. At this time the lever 561 has just disengaged one of the stationary cams 567, and since the lever 559 is also released the lever 561 now permits the contacts 562 and 563 to close to send a start impulse over the start-stop line. The continued rotation of the cage causes the positioning cams 555 to engage the end of lever 561, whereby contacts 562 and 563 are opened and closed to transmit impulses representing the signal previously stored in the distributor. Thus, while one signal is being transmitted, another may be stored in the start-stop distributor. The lever 568 serves to short-circuit the stop magnet 562 except when the distributor is in one of its normal positions.

The speed of the start-stop motor is such that the translator shafts make slightly more than one revoluation while the distributors 130 and 424 are completing ten cycles.

*Transmission of signals from the substation to the storing start-stop distributor.*

If the subscriber at substation 700 desires to send a telegram to a distant subscriber through the multiplex equipment, he will first communicate with the operator at position 732 by means of his telephone 706. The operator upon receiving the information communicates with an operator at a distant exchange, whereby the called substation 731, for instance, is connected to the same channel to which the calling line 710 has been assigned by the first exchange. This may be any one of the 96 channels selected at random, the only requirement being that the channel be idle at the time and that both calling and called lines be assigned to the same channel. After the connection has been established, the subscriber at station 700 throws the key 701 to its alternate position, thus disconnecting the telephone set 706 and connecting the telegraph equipment to the line 710. A ground potential may be connected to the tip and ring conductors of the line 710 at the central office, as, for example, by means of the operator's connecting circuit 714. Accordingly, a circuit is traceable from battery, over one side of the line 710, through the contacts of key 701, winding of relay 735, closed contacts of the alternating current relay 704, lower contact of key 701, and thence over the other side of the line 710 to ground. The relay 735 will operate its armature to its front contact, energizing the right winding of the printer magnet 738. The subscriber transmits the signals representing the message by means of any well known keyboard which operates a sending contact 703. Upon each closure of the contact 703, a circuit may be traced from battery at the central office, over one side of the line, through the upper contacts of key 701, coil 737, winding and contact of the interrupter relay 705, contact 703, and thence over the other side of the line to ground. Relay 705 is designed to interrupt its own circuit at the rate of the order of 800 cycles per second. The interruption of the circuit by relay 705 sets up an oscillatory current in the line which is transmitted through the operator's connecting circuit 714 and jack 715 to the relay 23, including the left winding of coil 741. The relay 23 has its armature tuned in such a manner that it will respond to currents of the order of 800 cycles per second. It will not be operated by direct currents or currents of other frequencies.

For a more detailed description of the construction of relay 23, reference is made to U. S. Patent 1,607,910 to H. W. O'Neill, November 23, 1926.

Each time the relay 23 opens its contacts, relay 43 releases its armatures and a circuit is closed from battery, through the right contact of relay 48, left contact of relay 43, winding of the code magnet 44 of the start-stop distributor 42. In the manner hereinbefore explained, the magnet 42 causes the signals to be stored in the start-stop distributor, from which they are delivered in turn to the multiplex distributor 716.

At the distant central office, signals are received by the multiplex distributor 726 and delivered to the start-stop distributor 750 of the proper channel. The start-stop distributor 750, by means of its sending contacts 562, closes a circuit from battery through said contacts, winding of relay 754, to ground. The relay 754 is designed to open its left contact slightly prior to the closing of its right contact. Each time the relay 754 operates, a circuit is closed including the alternating current generator 756 and the left winding of the transformer 755. The generator 756 produces an alternating current of the order of 800 cycles suitable for transmission over telephone lines. This alternating current induces a current in the right winding of the transformer 755 which is transmitted over the called subscriber's line 730 to operate the printer at the station 731. The relay 757 operates in response to the current flowing through its windings and causes the release of relay 758. Since, however, the left-hand contacts of relay 754 have already been opened, relay 758 is ineffective to close the circuit for the code magnet 759 of the start-stop distributor 760.

If the subscriber at station 731 wishes to reply to the subscriber at station 700, a connection is established over the cord circuit 761 and the jacks 762 and 723 to the transmission line 721. At the distant station, the line 721 is connected to the receiving multiplex distributor 752 by means of the cord circuit 763 and the jacks 720 and 764. Signals transmitted from the substation 731 pass through the relay 757 which actuates the relay 758 to in turn cause the operation of the code magnet 759. At the receiving end, shown in Fig. 7, the signals sent over the line are received by the distributor 752, and the start-stop distributor 765 operates its contacts 766 to close a circuit for the relay 48. Relay 48 connects the alternating current generator 767 to the right winding of the transformer 741, whereupon signals are induced in the left winding and transmitted to the substation 700.

Thus the system is so arranged that direct current is supplied from the central offices to operate the buzzers 705 and relays 735. The buzzers 705 in turn produce alternating current signals for operating relays 704 which interrupt the circuits of relays 735.

*Table showing the operation of the relays of the multiplex distributors.*

It is believed that the detailed operation of the multiplex distributors may first be explained by means of a table showing the condition of the relays over a period of time, which is divided up into intervals, necessary for the operation of the slowest portion of the distributing apparatus through one of its complete cycles. In other words, the first table will show what relays are operated during each successive interval of time over an entire period necessary for the relays of the distributor 120 to rotate through a complete cycle. One cycle of the distributor 120 represents a single impulse period for each of the six different channels leading in to said distributor. In order to send a complete signal on the basis of the Baudot or five-unit code, it will be necessary for the distributor 120 to pass through five such cycles in order to provide five impulse periods for each of the six different channels. Since each of the five different units of the code are repetitions of each other, the table is applicable to any unit. Inasmuch as the fast distributor 208 must be prepared to deliver to the line 96 impulses in the time that one of the slow distributors 120 is passing through a single cycle, in order to show the sequential operation of relays of the distributor 208 it is necessary to divide up the total time into 96 impulse intervals or periods. For each of these impulse periods, the table shows what relays of all three distributors are operated. For brevity, the table only shows the condition of relays 25, 26, 27 and 28 of the distributor 208, it being understood that whenever one of these relays is operated the remaining relays of the vertical set are also operated. Likewise, the condition only of relays 16, 17, 18, and 19 of the frequency changer 211 is given in the table. The same is true with respect to the relays of the distributors 130 and 120. Certain conventions are also employed with respect to the second portion of the table covering the receiving distributors. This will be explained later. The term "upper" means that the upper contact is shown and likewise for the term "lower".

*Transmitting distributor.*

| Period | Distributor relays operated |
|---|---|
| 1 | 38—40<br>25—26<br>20—19—16<br>15 upper—11—12<br>7 lower—10 upper<br>1—2 |
| 2 | 37—39<br>26—27<br>20—19—16<br>15 upper—11—12<br>7 lower—10 upper<br>1—2 |
| 3 | 38—40<br>27—28<br>24—16—17<br>15 upper—11—12<br>7 lower—10 upper<br>1—2 |
| 4 | 37—39<br>28—25<br>24—16—17<br>15 upper—11—12<br>7 lower—10 upper<br>1—2 |
| 5 | 38—40<br>25—26<br>20—17—18<br>15 lower—12—13<br>7 lower—10 upper<br>1—2 |
| 6 | 37—39<br>26—27<br>20—17—18<br>15 lower—12—13<br>7 lower—10 upper<br>1—2 |

*Transmitting distributor—Continued*

| Period | Distributor relays operated |
|---|---|
| 7 | 38—40<br>27—28<br>24—18—19<br>15 lower—12—13<br>7 lower—10 upper<br>1—2 |
| 8 | 37—39<br>28—25<br>24—18—19<br>15 lower—12—13<br>7 lower—10 upper<br>1—2 |
| 9 | 38—40<br>25—26<br>20—19—16<br>15 upper—13—14<br>7 upper—10 lower<br>2—3 |
| 10 | 37—39<br>26—27<br>20—19—16<br>15 upper—13—14<br>7 upper—10 lower<br>2—3 |
| 11 | 38—40<br>27—28<br>24—16—17<br>15 upper—13—14<br>7 upper—10 lower<br>2—3 |
| 12 | 37—39<br>28—25<br>24—16—17<br>15 upper—13—14<br>7 upper—10 lower<br>2—3 |
| 13 | 38—40<br>25—26<br>20—17—18<br>15 lower—14—11<br>7 upper—10 lower<br>2—3 |
| 14 | 37—39<br>26—27<br>20—17—18<br>15 lower—14—11<br>7 upper—10 lower<br>2—3 |
| 15 | 38—40<br>27—28<br>24—18—19<br>15 lower—14—11<br>7 upper—10 lower<br>2—3 |
| 16 | 37—39<br>28—25<br>24—18—19<br>15 lower—14—11<br>7 upper—10 lower<br>2—3 |
| 17 | 38—40<br>25—26<br>20—19—16<br>15 upper—11—12<br>7 lower—10 lower<br>2—3 |
| 18 | 37—39<br>26—27<br>20—19—16<br>15 upper—11—12<br>7 lower—10 lower<br>2—3 |
| 19 | 38—40<br>27—28<br>24—16—17<br>15 upper—11—12<br>7 lower—10 lower<br>2—3 |
| 20 | 37—39<br>28—25<br>24—16—17<br>15 upper—11—12<br>7 lower—10 lower<br>2—3 |
| 21 | 38—40<br>25—26<br>20—17—18<br>15 lower—12—13<br>7 lower—10 lower<br>2—3 |
| 22 | 37—39<br>26—27<br>20—17—18<br>15 lower—12—13<br>7 lower—10 lower<br>2—3 |
| 23 | 38—40<br>27—28<br>24—18—19<br>15 lower—12—13<br>7 lower—10 lower<br>2—3 |

16          1,708,954

*Transmitting distributor*—Continued

| Period | Distributor relays operated |
|---|---|
| 24 | 37—39<br>28—25<br>24—18—19<br>15 lower—12—13<br>7 lower—10 lower<br>2—3 |
| 25 | 38—40<br>25—26<br>20—19—16<br>15 upper—13—14<br>7 upper—10 upper<br>3—4 |
| 26 | 37—39<br>26—27<br>20—19—16<br>15 upper—13—14<br>7 upper—10 upper<br>3—4 |
| 27 | 38—40<br>27—28<br>24—16—17<br>15 upper—13—14<br>7 upper—10 upper<br>3—4 |
| 28 | 37—39<br>28—25<br>24—16—17<br>15 upper—13—14<br>7 upper—10 upper<br>3—4 |
| 29 | 38—40<br>25—26<br>20—17—18<br>15 lower—14—11<br>7 upper—10 upper<br>3—4 |
| 30 | 37—39<br>26—27<br>20—17—18<br>15 lower—14—11<br>7 upper—10 upper<br>3—4 |
| 31 | 38—40<br>27—28<br>24—18—19<br>15 lower—14—11<br>7 upper—10 upper<br>3—4 |
| 32 | 37—39<br>28—25<br>24—18—19<br>15 lower—14—11<br>7 upper—10 upper<br>3—4 |
| 33 | 38—40<br>25—26<br>19—16<br>15 upper—11—12<br>7 lower—10 upper<br>3—4 |
| 34 | 37—39<br>26—27<br>19—16<br>15 upper—11—12<br>7 lower—10 upper<br>3—4 |
| 35 | 38—40<br>27—28<br>16—17<br>15 upper—11—12<br>7 lower—10 upper<br>3—4 |
| 36 | 37—39<br>28—25<br>16—17<br>15 upper—11—12<br>7 lower—10 upper<br>3—4 |
| 37 | 38—40<br>25—26<br>17—18<br>15 lower—12—13<br>7 lower—10 upper<br>3—4 |
| 38 | 37—39<br>26—27<br>17—18<br>15 lower—12—13<br>7 lower—10 upper<br>3—4 |
| 39 | 38—40<br>27—28<br>18—19<br>15 lower—12—13<br>7 lower—10 upper<br>3—4 |
| 40 | 37—39<br>28—25<br>18—19<br>15 lower—12—13<br>7 lower—10 upper<br>3—4 |

*Transmitting distributor*—Continued

| Period | Distributor relays operated |
|---|---|
| 41 | 38—40<br>25—26<br>19—16<br>15 upper—13—14<br>7 upper—10 lower<br>4—5 |
| 42 | 37—39<br>26—27<br>19—16<br>15 upper—13—14<br>7 upper—10 lower<br>4—5 |
| 43 | 38—40<br>27—28<br>16—17<br>15 upper—13—14<br>7 upper—10 lower<br>4—5 |
| 44 | 37—39<br>28—25<br>16—17<br>15 upper—13—14<br>7 upper—10 lower<br>4—5 |
| 45 | 38—40<br>25—26<br>17—18<br>15 lower—14—11<br>7 upper—10 lower<br>4—5 |
| 46 | 37—39<br>26—27<br>17—18<br>15 lower—14—11<br>7 upper—10 lower<br>4—5 |
| 47 | 38—40<br>27—28<br>18—19<br>15 lower—14—11<br>7 upper—10 lower<br>4—5 |
| 48 | 37—39<br>28—25<br>18—19<br>15 lower—14—11<br>7 upper—10 lower<br>4—5 |
| 49 | 38—40<br>25—26<br>19—16<br>15 upper—11—12<br>7 lower—10 lower<br>4—5 |
| 50 | 37—39<br>26—27<br>19—16<br>15 upper—11—12<br>7 lower—10 lower<br>4—5 |
| 51 | 38—40<br>27—28<br>16—17<br>15 upper—11—12<br>7 lower—10 lower<br>4—5 |
| 52 | 37—39<br>28—25<br>16—17<br>15 upper—11—12<br>7 lower—10 lower<br>4—5 |
| 53 | 38—40<br>25—26<br>17—18<br>15 lower—12—13<br>7 lower—10 lower<br>4—5 |
| 54 | 37—39<br>26—27<br>17—18<br>15 lower—12—13<br>7 lower—10 lower<br>4—5 |
| 55 | 38—40<br>27—28<br>18—19<br>15 lower—12—13<br>7 lower—10 lower<br>4—5 |
| 56 | 37—39<br>28—25<br>18—19<br>15 lower—12—13<br>7 lower—10 lower<br>4—5 |
| 57 | 38—40<br>25—26<br>19—16<br>15 upper—13—14<br>7 upper—10 upper<br>5—6 |

*Transmitting distributor*—Continued

| Period | Distributor relays operated |
|---|---|
| 58 | 37—39<br>26—27<br>19—16<br>15 upper—13—14<br>7 upper—10 upper<br>5—6 |
| 59 | 38—40<br>27—28<br>16—17<br>15 upper—13—14<br>7 upper—10 upper<br>5—6 |
| 60 | 37—39<br>28—25<br>16—17<br>15 upper—13—14<br>7 upper—10 upper<br>5—6 |
| 61 | 38—40<br>25—26<br>17—18<br>15 lower—14—11<br>7 upper—10 upper<br>5—6 |
| 62 | 37—39<br>26—27<br>17—18<br>15 lower—14—11<br>7 upper—10 upper<br>5—6 |
| 63 | 38—40<br>27—28<br>18—19<br>15 lower—14—11<br>7 upper—10 upper<br>5—6 |
| 64 | 37—39<br>28—25<br>18—19<br>15 lower—14—11<br>7 upper—10 upper<br>5—6 |
| 65 | 38—40<br>25—26<br>19—16<br>15 upper—11—12<br>7 lower—10 upper<br>5—6 |
| 66 | 37—39<br>26—27<br>19—16<br>15 upper—11—12<br>7 lower—10 upper<br>5—6 |
| 67 | 38—40<br>27—28<br>16—17<br>15 upper—11—12<br>7 lower—10 upper<br>5—6 |
| 68 | 37—39<br>28—25<br>16—17<br>15 upper—11—12<br>7 lower—10 upper<br>5—6 |
| 69 | 38—40<br>25—26<br>17—18<br>15 lower—12—13<br>7 lower—10 upper<br>5—6 |
| 70 | 37—39<br>26—27<br>17—18<br>15 lower—12—13<br>7 lower—10 upper<br>5—6 |
| 71 | 38—40<br>27—28<br>18—19<br>15 lower—12—13<br>7 lower—10 upper<br>5—6 |
| 72 | 37—39<br>28—25<br>18—19<br>15 lower—12—13<br>7 lower—10 upper<br>5—6 |
| 73 | 38—40<br>25—26<br>19—16<br>15 upper—13—14<br>7 upper—10 lower<br>6—1 |
| 74 | 37—39<br>26—27<br>19—16<br>15 upper—13—14<br>7 upper—10 lower<br>6—1 |

*Transmitting distributor*—Continued

| Period | Distributor relays operated |
|---|---|
| 75 | 38—40<br>27—28<br>16—17<br>15 upper—13—14<br>7 upper—10 lower<br>6—1 |
| 76 | 37—39<br>28—25<br>16—17<br>15 upper—13—14<br>7 upper—10 lower<br>6—1 |
| 77 | 38—40<br>25—26<br>17—18<br>15 lower—14—11<br>7 upper—10 lower<br>6—1 |
| 78 | 37—39<br>26—27<br>17—18<br>15 lower—14—11<br>7 upper—10 lower<br>6—1 |
| 79 | 38—40<br>27—28<br>18—19<br>15 lower—14—11<br>7 upper—10 lower<br>6—1 |
| 80 | 37—39<br>28—25<br>18—19<br>15 lower—14—11<br>7 upper—10 lower<br>6—1 |
| 81 | 38—40<br>25—26<br>19—16<br>15 upper—11—12<br>7 lower—10 lower<br>6—1 |
| 82 | 37—39<br>26—27<br>19—16<br>15 upper—11—12<br>7 lower—10 lower<br>6—1 |
| 83 | 38—40<br>27—28<br>16—17<br>15 upper—11—12<br>7 lower—10 lower<br>6—1 |
| 84 | 37—39<br>28—25<br>16—17<br>15 upper—11—12<br>7 lower—10 lower<br>6—1 |
| 85 | 38—40<br>25—26<br>17—18<br>15 lower—12—13<br>7 lower—10 lower<br>6—1 |
| 86 | 37—39<br>26—27<br>17—18<br>15 lower—12—13<br>7 lower—10 lower<br>6—1 |
| 87 | 38—40<br>27—28<br>18—19<br>15 lower—12—13<br>7 lower—10 lower<br>6—1 |
| 88 | 37—39<br>28—25<br>18—19<br>15 lower—12—13<br>7 lower—10 lower<br>6—1 |
| 89 | 38—40<br>25—26<br>19—16<br>15 upper—13—14<br>7 upper—10 upper<br>1—2 |
| 90 | 37—39<br>26—27<br>19—16<br>15 upper—13—14<br>7 upper—10 upper<br>1—2 |
| 91 | 38—40<br>27—28<br>16—17<br>15 upper—13—14<br>7 upper—10 upper<br>1—2 |

*Transmitting distributor*—Continued

| Period | Distributor relays operated |
|---|---|
| 92 | 37—39<br>28—25<br>16—17<br>15 upper—13—14<br>7 upper—10 upper<br>1—2 |
| 93 | 38—40<br>25—26<br>17—18<br>15 lower—14—11<br>7 upper—10 upper<br>1—2 |
| 94 | 37—39<br>26—27<br>17—18<br>15 lower—14—11<br>7 upper—10 upper<br>1—2 |
| 95 | 38—40<br>27—28<br>18—19<br>15 lower—14—11<br>7 upper—10 upper<br>1—2 |
| 96 | 37—39<br>28—25<br>18—19<br>15 lower—14—11<br>7 upper—10 upper<br>1—2 |

The remaining portion of the table given below covers in a similar manner the operation of the distributor at the receiving end. The same amount of time is required for the distributing mechanism 424 to cover a complete cycle as is required for the distributor 120 at the sending end. Since, however, the distributor 422 has twice as many sets of relays, it has been found convenient to divide the double time given in the following table into twice as many periods as was the case in the first table. As in the first portion of the table, several of the relays of the set are not mentioned but it will be clear from the relays mentioned what sets of relays are operated at the time. Throughout the table the words "upper" and "lower" will be found, qualifying the numeral of designations of various polarized relays. "Upper" means the upper contact is closed, whereas "lower" means the lower contact is closed.

*Receiving distributor.*

| Period | Distributor relays operated |
|---|---|
| 1 | 68<br>63—73—72<br>89<br>92—93<br>95 upper<br>98—99<br>107 upper—106 upper<br>108—109 |
| 2 | 69<br>73—72—60<br>89<br>92—93<br>95 upper<br>98—99<br>107 upper—106 upper<br>108—109 |
| 3 | 68<br>60—75—74<br>89<br>92—93<br>95 upper<br>98—99<br>107 upper—106 upper<br>108—109 |

*Receiving distributor*—Continued

| Period | Distributor relays operated |
|---|---|
| 4 | 69<br>75—74—61<br>88<br>93—90<br>95 lower<br>99—100<br>107 upper—106 upper<br>108—109 |
| 5 | 68<br>61—77—76<br>88<br>93—90<br>95 lower<br>99—100<br>107 upper—106 upper<br>108—109 |
| 6 | 69<br>77—76—62<br>88<br>93—90<br>95 lower<br>99—100<br>107 upper—106 upper<br>108—109 |
| 7 | 68<br>62—79—78<br>88<br>93—90<br>95 lower<br>99—100<br>107 upper—106 upper<br>108—109 |
| 8 | 69<br>79—78—63<br>89<br>90—91<br>95 lower<br>99—100<br>107 upper—106 upper<br>108—109 |
| 9 | 68<br>63—73—72<br>89<br>90—91<br>95 lower<br>99—100<br>107 upper—106 upper<br>108—109 |
| 10 | 69<br>63—72—60<br>89<br>90—91<br>95 lower<br>99—100<br>107 upper—106 upper<br>108—109 |
| 11 | 68<br>60—75—74<br>89<br>90—91<br>95 lower<br>99—100<br>107 upper—106 upper<br>108—109 |
| 12 | 69<br>75—74—61<br>88<br>91—92<br>95 upper<br>100—101<br>107 lower—106 upper<br>108—109 |
| 13 | 68<br>61—77—76<br>88<br>91—92<br>95 upper<br>100—101<br>107 lower—106 upper<br>108—109 |
| 14 | 69<br>77—76—62<br>88<br>91—92<br>95 upper<br>100—101<br>107 lower—106 upper<br>108—109 |
| 15 | 68<br>62—79—78<br>88<br>91—92<br>95 upper<br>100—101<br>107 lower—106 upper<br>108—109 |

*Receiving distributor*—Continued

| Period | Distributor relays operated |
|---|---|
| 16 | 69<br>79—78—63<br>89<br>92—93<br>95 upper<br>100—101<br>107 lower—106 upper<br>108—109 |
| 17 | 68<br>63—73—72<br>89<br>92—93<br>95 upper<br>100—101<br>107 lower—106 upper<br>108—109 |
| 18 | 69<br>73—72—60<br>89<br>92—93<br>95 upper<br>100—101<br>107 lower—106 upper<br>108—109 |
| 19 | 68<br>60—75—74<br>89<br>92—93<br>95 upper<br>100—101<br>107 lower—106 upper<br>108—109 |
| 20 | 69<br>75—74—61<br>88<br>93—90<br>95 lower<br>101—98<br>107 upper—106 lower<br>109—110 |
| 21 | 68<br>61—77—76<br>88<br>93—90<br>95 lower<br>101—98<br>107 upper—106 lower<br>109—110 |
| 22 | 69<br>77—76—62<br>88<br>93—90<br>95 lower<br>101—98<br>107 upper—106 lower<br>109—110 |
| 23 | 68<br>62—79—78<br>88<br>93—90<br>95 lower<br>101—98<br>107 upper—106 lower<br>109—110 |
| 24 | 69<br>79—78—63<br>89<br>90—91<br>95 lower<br>101—98<br>107 upper—106 lower<br>109—110 |
| 25 | 68<br>63—73—72<br>89<br>90—91<br>95 lower<br>101—98<br>107 upper—106 lower<br>109—110 |
| 26 | 69<br>73—72—60<br>89<br>90—91<br>95 lower<br>101—98<br>107 upper—106 lower<br>109—110 |
| 27 | 68<br>60—75—74<br>89<br>90—91<br>95 lower<br>101—98<br>107 upper—106 lower<br>109—110 |

*Receiving distributor*—Continued

| Period | Distributor relays operated |
|---|---|
| 28 | 69<br>75—74—61<br>88<br>91—92<br>95 lower<br>98—99<br>107 upper—106 lower<br>109—110 |
| 29 | 68<br>61—77—76<br>88<br>91—92<br>95 upper<br>98—99<br>107 upper—106 lower<br>109—110 |
| 30 | 69<br>77—76—62<br>88<br>91—92<br>95 upper<br>98—99<br>107 upper—106 lower<br>109—110 |
| 31 | 68<br>62—79—78<br>88<br>91—92<br>95 upper<br>98—99<br>107 upper—106 lower<br>109—110 |
| 32 | 69<br>79—78—63<br>89<br>92—93<br>95 upper<br>98—99<br>107 upper—106 lower<br>109—110 |
| 33 | 68<br>63—73—72<br>89<br>92—93<br>95 upper<br>98—99<br>107 upper—106 lower<br>109—110 |
| 34 | 69<br>73—72—60<br>89<br>92—93<br>95 upper<br>98—99<br>107 upper—106 lower<br>109—110 |
| 35 | 68<br>60—75—75<br>89<br>92—93<br>95 upper<br>98—99<br>107 upper—106 lower<br>109—110 |
| 36 | 69<br>75—74—61<br>88<br>93—90<br>95 lower<br>99—100<br>107 upper—106 lower<br>109—110 |
| 37 | 68<br>61—77—76<br>88<br>93—90<br>95 lower<br>99—100<br>107 upper—106 lower<br>109—110 |
| 38 | 69<br>77—76—62<br>88<br>93—90<br>95 lower<br>99—100<br>107— upper—106 lower<br>109—110 |
| 39 | 68<br>62—79—78<br>88<br>93—90<br>95 lower<br>99—100<br>107 upper—106 lower<br>109—110 |

*Receiving distributor*—Continued

| Period | Distributor relays operated |
|---|---|
| 40 | 69<br>79—78—63<br>89<br>90—91<br>95 lower<br>99—100<br>107 upper—106 lower<br>109—110 |
| 41 | 68<br>63—73—72<br>89<br>90—91<br>95 lower<br>99—100<br>107 upper—106 lower<br>109—110 |
| 42 | 69<br>73—72—60<br>89<br>90—91<br>95 lower<br>99—100<br>107 upper—106 lower<br>109—110 |
| 43 | 68<br>60—75—74<br>89<br>90—91<br>95 lower<br>99—100<br>107 upper—106 lower<br>109—110 |
| 44 | 69<br>75—74—61<br>88<br>91—92<br>95 upper<br>100—101<br>107 lower—106 lower<br>109—110 |
| 45 | 68<br>61—77—76<br>88<br>91—92<br>95 upper<br>100—101<br>107 lower—106 lower<br>109—110 |
| 46 | 69<br>77—76—62<br>88<br>91—92<br>95 upper<br>100—101<br>107 lower—106 lower<br>109—110 |
| 47 | 68<br>62—79—78<br>88<br>91—92<br>95 upper<br>100—101<br>107 lower—106 lower<br>109—110 |
| 48 | 69<br>79—78—63<br>89<br>92—93<br>95 upper<br>100—101<br>107 lower—106 lower<br>109—110 |
| 49 | 68<br>63—73—72<br>89<br>92—93<br>95 upper<br>100—101<br>107 lower—106 lower<br>109—110 |
| 50 | 69<br>73—72—60<br>89<br>92—93<br>95 upper<br>100—101<br>107 lower—106 lower<br>109—110 |
| 51 | 68<br>60—75—74<br>89<br>92—93<br>95 upper<br>100—101<br>107 lower—106 lower<br>109—110 |

*Receiving distributor*—Continued

| Period | Distributor relays operated |
|---|---|
| 52 | 69<br>75—74—61<br>88<br>93—90<br>95 lower<br>101—98<br>107 upper—106 upper<br>110—111 |
| 53 | 68<br>61—77—76<br>88<br>93—90<br>95 lower<br>101—98<br>107 upper—106 upper<br>110—111 |
| 54 | 69<br>77—76—62<br>88<br>93—90<br>95 lower<br>101—98<br>107 upper—106 upper<br>110—111 |
| 55 | 68<br>62—79—78<br>88<br>93—90<br>95 lower<br>101—98<br>107 upper—106 upper<br>110—111 |
| 56 | 69<br>79—78—63<br>89<br>90—91<br>95 lower<br>101—98<br>107 upper—106 upper<br>110—111 |
| 57 | 68<br>63—73—72<br>89<br>90—91<br>95 lower<br>101—98<br>107 upper—106 upper<br>110—111 |
| 58 | 69<br>73—72—60<br>89<br>90—91<br>95 lower<br>101—98<br>107 upper—106 upper<br>110—111 |
| 59 | 68<br>60—75—74<br>89<br>90—91<br>95 lower<br>101—98<br>107 upper—106 upper<br>110—111 |
| 60 | 69<br>75—74—61<br>88<br>91—92<br>95 upper<br>98—99<br>107 upper—106 upper<br>110—111 |
| 61 | 68<br>61—77—76<br>88<br>91—92<br>95 upper<br>98—99<br>107 upper—106 upper<br>110—111 |
| 62 | 69<br>77—76—62<br>88<br>91—92<br>95 upper<br>98—99<br>107 upper—106 upper<br>110—111 |
| 63 | 68<br>62—79—78<br>88<br>91—92<br>95 upper<br>98—99<br>107 upper—106 upper<br>110—111 |

*Receiving distributor*—Continued

| Period | Distributor relays operated |
|---|---|
| 64 | 69<br>79—78—63<br>89<br>92—93<br>95 upper<br>98—99<br>107 upper—106 upper<br>110—111 |
| 65 | 68<br>63—73—72<br>89<br>92—93<br>95 upper<br>98—99<br>107 upper—106 upper<br>110—111 |
| 66 | 69<br>73—72—60<br>89<br>92—93<br>95 upper<br>98—99<br>107 upper—106 upper<br>110—111 |
| 67 | 68<br>60—75—74<br>89<br>92—93<br>95 upper<br>98—99<br>107 upper—106 upper<br>110—111 |
| 68 | 69<br>75—74—61<br>88<br>93—90<br>95 lower<br>99—100<br>107 upper—106 upper<br>110—111 |
| 69 | 68<br>61—77—76<br>88<br>93—90<br>95 lower<br>99—100<br>107 upper—106 upper<br>110—111 |
| 70 | 69<br>77—76—62<br>88<br>93—90<br>95 lower<br>99—100<br>107 upper—106 upper<br>110—111 |
| 71 | 68<br>62—79—78<br>88<br>93—90<br>95 lower<br>99—100<br>107 upper—106 upper<br>110—111 |
| 72 | 69<br>79—78—63<br>89<br>90—91<br>95 lower<br>99—100<br>107 upper—106 upper<br>110—111 |
| 73 | 68<br>63—73—72<br>89<br>90—91<br>95 lower<br>99—100<br>107 upper—106 upper<br>110—111 |
| 74 | 69<br>73—72—60<br>89<br>90—91<br>95 lower<br>99—100<br>107 upper—106 upper<br>110—111 |
| 75 | 68<br>60—75—74<br>89<br>90—91<br>95 lower<br>99—100<br>107 upper—106 upper<br>110—111 |

*Receiving distributor*—Continued

| Period | Distributor relays operated |
|---|---|
| 76 | 69<br>75—74—61<br>88<br>91—92<br>95 upper<br>100—101<br>107 lower—106 upper<br>110—111 |
| 77 | 68<br>61—77—76<br>88<br>91—92<br>95 upper<br>100—101<br>107 lower—106 upper<br>110—111 |
| 78 | 69<br>77—76—62<br>88<br>91—92<br>95 upper<br>100—101<br>107 lower—106 upper<br>101—111 |
| 79 | 68<br>62—79—78<br>88<br>91—92<br>95 upper<br>100—101<br>107 lower—106 upper<br>110—111 |
| 80 | 69<br>79—78—63<br>89<br>92—93<br>95 upper<br>100—101<br>107 lower—106 upper<br>110—111 |
| 81 | 68<br>63—73—72<br>89<br>92—93<br>95 upper<br>100—101<br>107 lower—106 upper<br>110—111 |
| 82 | 69<br>73—72—60<br>89<br>92—93<br>95 upper<br>100—101<br>107 lower—106 upper<br>110—111 |
| 83 | 68<br>60—75—74<br>89<br>92—93<br>95 upper<br>100—101<br>107 lower—106 upper<br>110—111 |
| 84 | 69<br>75—74—61<br>88<br>93—90<br>95 lower<br>101—98<br>107 upper—106 lower<br>111—112 |
| 85 | 68<br>61—77—76<br>88<br>93—90<br>95 lower<br>101—98<br>107 upper—106 lower<br>111—112 |
| 86 | 69<br>77—76—62<br>88<br>93—90<br>95 lower<br>101—98<br>107 upper—106 lower<br>111—112 |
| 87 | 68<br>62—79—78<br>88<br>93—90<br>95 lower<br>101—98<br>107 upper—106 lower<br>111—112 |

*Receiving distributor*—Continued

| Period | Distributor relays operated |
|---|---|
| 88 | 69<br>79—78—63<br>89<br>90—91<br>95 lower<br>101—98<br>107 upper—106 lower<br>111—112 |
| 89 | 68<br>63—73—72<br>89<br>90—91<br>95 lower<br>101—98<br>107 upper—106 lower<br>111—112 |
| 90 | 69<br>73—72—60<br>89<br>90—91<br>95 lower<br>101—98<br>107 upper—106 lower<br>111—112 |
| 91 | 68<br>60—75—74<br>89<br>90—91<br>95 lower<br>101—98<br>107 upper—106 lower<br>111—112 |
| 92 | 69<br>75—74—61<br>88<br>91—92<br>95 upper<br>98—99<br>107 upper—106 lower<br>111—112 |
| 93 | 68<br>61—77—76<br>88<br>91—92<br>95 upper<br>98—99<br>107 upper—106 lower<br>111—112 |
| 94 | 69<br>77—76—62<br>88<br>91—92<br>95 upper<br>98—99<br>107 upper—106 lower<br>111—112 |
| 95 | 68<br>62—79—78<br>88<br>91—92<br>95 upper<br>98—99<br>107 upper—106 lower<br>111—112 |
| 96 | 69<br>79—78—63<br>89<br>92—93<br>95 upper<br>98—99<br>107 upper—106 lower<br>111—112 |
| 97 | 68<br>63—73—72<br>89<br>92—93<br>95 upper<br>98—99<br>107 upper—106 lower<br>111—112 |
| 98 | 69<br>73—72—60<br>89<br>92—93<br>95 upper<br>98—99<br>107 upper—106 lower<br>111—112 |
| 99 | 68<br>60—75—74<br>89<br>92—93<br>95 upper<br>98—99<br>107 upper—106 lower<br>111—112 |

*Receiving distributor*—Continued

| Period | Distributor relays operated |
|---|---|
| 100 | 69<br>75—74—61<br>88<br>93—90<br>95 lower<br>99—100<br>107 upper—106 lower<br>111—112 |
| 101 | 68<br>61—77—76<br>88<br>93—90<br>95 lower<br>99—100<br>107 upper—106 lower<br>111—112 |
| 102 | 69<br>77—76—62<br>88<br>93—90<br>95 lower<br>99—100<br>107 upper—106 lower<br>111—112 |
| 103 | 68<br>62—79—78<br>88<br>93—90<br>95 lower<br>99—100<br>107 upper—106 lower<br>111—112 |
| 104 | 69<br>79—78—63<br>89<br>90—91<br>95 lower<br>99—100<br>107 upper—106 lower<br>111—112 |
| 105 | 68<br>63—73—72<br>89<br>90—91<br>95 lower<br>99—100<br>107 upper—106 lower<br>111—112 |
| 106 | 69<br>73—72—60<br>89<br>90—91<br>95 lower<br>99—100<br>107 upper—106 lower<br>111—112 |
| 107 | 68<br>60—75—74<br>89<br>90—91<br>95 lower<br>99—100<br>107 upper—106 lower<br>111—112 |
| 108 | 69<br>75—74—61<br>88<br>91—92<br>95 upper<br>100—101<br>107 lower—106 lower<br>111—112 |
| 109 | 68<br>61—77—76<br>88<br>91—92<br>95 upper<br>100—101<br>107 lower—106 lower<br>111—112 |
| 110 | 69<br>77—76—62<br>88<br>91—92<br>95 upper<br>100—101<br>107 lower—106 lower<br>111—112 |
| 111 | 68<br>62—79—78<br>88<br>91—92<br>95 upper<br>100—101<br>107 lower—106 lower<br>111—112 |

*Receiving distributor*—Continued

| Period | Distributor relays operated |
|---|---|
| 112 | 69<br>79—78—63<br>89<br>92—93<br>95 upper<br>100—101<br>107 lower—106 lower<br>111—112 |
| 113 | 68<br>63—73—72<br>89<br>92—93<br>95 upper<br>100—101<br>107 lower—106 lower<br>111—112 |
| 114 | 69<br>73—72—60<br>89<br>92—93<br>95 upper<br>100—101<br>107 lower—106 lower<br>111—112 |
| 115 | 68<br>60—75—74<br>89<br>92—93<br>95 upper<br>100—101<br>107 lower—106 lower<br>111—112 |
| 116 | 69<br>75—74—61<br>88<br>93—90<br>95 lower<br>101—98<br>107 upper—106 upper<br>112—113 |
| 117 | 68<br>61—77—76<br>88<br>93—90<br>95 lower<br>101—98<br>107 upper—106 upper<br>112—113 |
| 118 | 69<br>77—76—62<br>88<br>93—90<br>95 lower<br>101—98<br>107 upper—106 upper<br>112—113 |
| 119 | 68<br>62—79—78<br>88<br>93—90<br>95 lower<br>101—98<br>107 upper—106 upper<br>112—113 |
| 120 | 69<br>79—78—63<br>89<br>90—91<br>95 lower<br>101—98<br>107 upper—106 upper<br>112—113 |
| 121 | 68<br>63—73—72<br>89<br>90—91<br>95 lower<br>101—98<br>107 upper—106 upper<br>112—113 |
| 122 | 69<br>73—72—60<br>89<br>90—91<br>95 lower<br>101—98<br>107 upper—106 upper<br>112—113 |
| 123 | 68<br>60—75—74<br>89<br>90—91<br>95 lower<br>101—98<br>107 upper—106 upper<br>112—113 |

*Receiving distributor*—Continued

| Period | Distributor relays operated |
|---|---|
| 124 | 69<br>75—74—61<br>88<br>91—92<br>95 upper<br>98—99<br>107 upper—106 upper<br>112—113 |
| 125 | 68<br>61—77—76<br>88<br>91—92<br>95 upper<br>98—99<br>107 upper—106 upper<br>112—113 |
| 126 | 69<br>77—76—62<br>88<br>91—92<br>95 upper<br>98—99<br>107 upper—106 upper<br>112—113 |
| 127 | 68<br>62—79—78<br>88<br>91—92<br>95 upper<br>98—99<br>107 upper—106 upper<br>112—113 |
| 128 | 69<br>79—78—63<br>89<br>92—93<br>95 upper<br>98—99<br>107 upper—106 upper<br>112—113 |
| 129 | 68<br>63—73—72<br>89<br>92—93<br>95 upper<br>98—99<br>107 upper—106 upper<br>112—113 |
| 130 | 69<br>73—72—60<br>89<br>92—93<br>95 upper<br>98—99<br>107 upper—106 upper<br>112—113 |
| 131 | 68<br>60—75—74<br>89<br>92—93<br>95 upper<br>98—99<br>107 upper—106 upper<br>112—113 |
| 132 | 69<br>75—74—61<br>88<br>93—90<br>95 lower<br>99—100<br>107 upper—106 upper<br>112—113 |
| 133 | 68<br>61—77—76<br>88<br>93—90<br>95 lower<br>99—100<br>107 upper—106 upper<br>112—113 |
| 134 | 69<br>77—76—62<br>88<br>93—90<br>95 lower<br>99—100<br>107 upper—106 upper<br>112—113 |
| 135 | 68<br>62—79—78<br>88<br>93—90<br>95 lower<br>99—100<br>107 upper—106 upper<br>112—113 |

Receiving distributor—Continued

| Period | Distributor relays operated |
|---|---|
| 136 | 69<br>79—78—63<br>89<br>90—91<br>95 lower<br>99—100<br>107 upper —106 upper<br>112—113 |
| 137 | 68<br>63—73—72<br>89<br>90—91<br>95 lower<br>99—100<br>107 upper—106 upper<br>112—113 |
| 138 | 69<br>73—72—60<br>89<br>90—91<br>95 lower<br>99—100<br>107 upper—106 upper<br>112—113 |
| 139 | 68<br>60—75—74<br>89<br>90—91<br>95 lower<br>99—100<br>107 upper—106 upper<br>112—113 |
| 140 | 69<br>75—74—61<br>88<br>91—92<br>95 upper<br>100—101<br>107 lower—106 upper<br>112—113 |
| 141 | 68<br>61—77—76<br>88<br>91—92<br>95 upper<br>100—101<br>107 lower—106 upper<br>112—113 |
| 142 | 69<br>77—76—62<br>88<br>91—92<br>95 upper<br>100—101<br>107 lower—106 upper<br>112—113 |
| 143 | 68<br>62—79—78<br>88<br>91—92<br>95 upper<br>100—101<br>107 lower—106 upper<br>112—113 |
| 144 | 69<br>79—78—63<br>89<br>92—93<br>95 upper<br>100—101<br>107 lower— 106 upper<br>112—113 |
| 145 | 68<br>63—73—72<br>89<br>92—93<br>95 upper<br>100—101<br>107 lower—106 upper<br>112—113 |
| 146 | 69<br>73—72—60<br>89<br>92—93<br>95 upper<br>100—101<br>107 lower—106 upper<br>112—113 |
| 147 | 68<br>60—75—74<br>89<br>92—93<br>95 upper<br>100—101<br>107 lower—106 upper<br>112—113 |

Receiving distributor—Continued

| Period | Distributor relays operated |
|---|---|
| 148 | 69<br>75—74—61<br>88<br>93—90<br>95 lower<br>101—98<br>107 upper—106 lower<br>113—108 |
| 149 | 68<br>61—77—76<br>88<br>93—90<br>95 lower<br>101—98<br>107 upper—106 lower<br>113—108 |
| 150 | 69<br>77—76—62<br>88<br>93—90<br>95 lower<br>101—98<br>107 upper—106 lower<br>113—108 |
| 151 | 68<br>62—79—78<br>88<br>93—90<br>95 lower<br>101—98<br>107 upper—106 lower<br>113—108 |
| 152 | 69<br>79—78—63<br>89<br>90—91<br>95 lower<br>101—98<br>107 upper—106 lower<br>113—108 |
| 153 | 68<br>63—73—72<br>89<br>90—91<br>95 lower<br>101—98<br>107 upper—106 lower<br>113—108 |
| 154 | 69<br>73—72—60<br>89<br>90—91<br>95 lower<br>101—98<br>107 upper—106 lower<br>113—108 |
| 155 | 68<br>60—75—74<br>89<br>90—91<br>95 lower<br>101—98<br>107 upper—106 lower<br>113—108 |
| 156 | 69<br>75—74—61<br>88<br>91—92<br>95 upper<br>98—99<br>107 upper—106 lower<br>113—108 |
| 157 | 68<br>61—77—76<br>88<br>91—92<br>95 upper<br>98—99<br>107 upper—106 lower<br>113—108 |
| 158 | 69<br>77—76—62<br>88<br>91—92<br>95 upper<br>98—99<br>107 upper—106 lower<br>113—108 |
| 159 | 68<br>62—79—78<br>88<br>91—92<br>95 upper<br>98—99<br>107 upper—106 lower<br>113—108 |

*Receiving distributor*—Continued

| Period | Distributor relays operated |
|---|---|
| 160 | 69<br>79—78—63<br>89<br>92—93<br>95 upper<br>98—99<br>107 upper—106 lower<br>113—108 |
| 161 | 68<br>63—73—72<br>89<br>92—93<br>95 upper<br>98—99<br>107 upper—106 lower<br>113—108 |
| 162 | 69<br>73—72—60<br>89<br>92—93<br>95 upper<br>98—99<br>107 upper—106 lower<br>113—108 |
| 163 | 68<br>60—75—74<br>89<br>92—93<br>95 upper<br>98—99<br>107 upper—106 lower<br>113—108 |
| 164 | 69<br>75—74—61<br>88<br>93—90<br>95 lower<br>99—100<br>107 upper—106 lower<br>113—108 |
| 165 | 68<br>61—77—76<br>88<br>93—90<br>95 lower<br>99—100<br>107 upper—106 lower<br>113—108 |
| 166 | 69<br>77—76—62<br>88<br>93—90<br>95 lower<br>99—100<br>107 upper—106 lower<br>113—108 |
| 167 | 68<br>62—79—78<br>88<br>93—90<br>95 lower<br>99—100<br>107 upper—106 lower<br>113—108 |
| 168 | 69<br>79—78—63<br>89<br>90—91<br>95 lower<br>99—100<br>107 upper—106 lower<br>113—108 |
| 169 | 68<br>63—73—72<br>89<br>90—91<br>95 lower<br>99—100<br>107 upper—106 lower<br>113—108 |
| 170 | 69<br>73—72—60<br>89<br>90—91<br>95 lower<br>99—100<br>107 upper—106 lower<br>113—108 |
| 171 | 68<br>60—75—74<br>89<br>90—91<br>95 lower<br>99—100<br>107 upper—106 lower<br>113—108 |

*Receiving distributor*—Continued

| Period | Distributor relays operated |
|---|---|
| 172 | 69<br>75—74—61<br>88<br>91—92<br>95 upper<br>100—101<br>107 lower—106 lower<br>113—108 |
| 173 | 68<br>61—77—76<br>88<br>91—92<br>95 upper<br>100—101<br>107 lower—106 lower<br>113—108 |
| 174 | 69<br>77—76—62<br>88<br>91—92<br>95 upper<br>100—101<br>107 lower—106 lower<br>113—108 |
| 175 | 68<br>62—79—78<br>88<br>91—92<br>95 upper<br>100—101<br>107 lower—106 lower<br>113—108 |
| 176 | 69<br>79—78—63<br>89<br>92—93<br>95 upper<br>100—101<br>107 lower—106 lower<br>113—108 |
| 177 | 68<br>63—73—72<br>89<br>92—93<br>95 upper<br>100—101<br>107 lower—106 lower<br>113—108 |
| 178 | 69<br>73—72—60<br>89<br>92—93<br>95 upper<br>100—101<br>107 lower—106 lower<br>113—108 |
| 179 | 68<br>60—75—74<br>89<br>92—93<br>95 upper<br>100—101<br>107 lower—106 lower<br>113—108 |
| 180 | 69<br>75—74—61<br>88<br>93—90<br>95 lower<br>101—98<br>107 upper—106 upper<br>108—109 |
| 181 | 68<br>61—77—76<br>88<br>93—90<br>95 lower<br>101—98<br>107 upper—106 upper<br>108—109 |
| 182 | 69<br>77—76—62<br>88<br>93—90<br>95 lower<br>101—98<br>107 upper—106 upper<br>108—109 |
| 183 | 68<br>62—79—78<br>88<br>93—90<br>95 lower<br>101—98<br>107 upper—106 upper<br>108—109 |

*Receiving distributor*—Continued

| Period | Distributor relays operated |
|---|---|
| 184 | 69<br>79—78—63<br>89<br>90—91<br>95 lower<br>101—98<br>107 upper—106 upper<br>108—109 |
| 185 | 68<br>63—73—72<br>89<br>90—91<br>95 lower<br>101—98<br>107 upper—106 upper<br>108—109 |
| 186 | 69<br>73—72—60<br>89<br>90—91<br>95 lower<br>101—98<br>107 upper—106 upper<br>108—109 |
| 187 | 68<br>60—75—74<br>89<br>90—91<br>95 lower<br>101—98<br>107 upper—106 upper<br>108—109 |
| 188 | 69<br>75—74—61<br>88<br>91—92<br>95 upper<br>98—99<br>107 upper—106 upper<br>108—109 |
| 189 | 68<br>61—77—76<br>88<br>91—92<br>95 upper<br>98—99<br>107 upper—106 upper<br>108—109 |
| 190 | 69<br>77—76—62<br>88<br>91—92<br>95 upper<br>98—99<br>107 upper—106 upper<br>108—109 |
| 191 | 68<br>62—79—78<br>88<br>91—90<br>95 upper<br>98—99<br>107 upper—106 upper<br>108—109 |
| 192 | 69<br>79—78—63<br>89<br>92—93<br>95 upper<br>98—99<br>107 upper—106 upper<br>108—109 |

*Detailed description of the operation of the multiplex distributors.*

A detailed description will now be given of the manner in which the distributors operate. For this purpose, reference will be had to the above tables. Consider first the distributing equipment (Figs. 1 and 2) at the transmitting station. Assume that at a given instant the current generated by the oscillator 202 is in such a direction as to close the thermionic relays 38 and 40. With relay 40 closed, a circuit may be traced from battery, through the relay 40, operating winding 187 of the relay 34, through the relay 29, release winding 185 of the relay 36, and thence to ground. The relay 29 has been previously operated and accordingly the relay 34 operates and relay 36, which was also previously operated, releases. Relay 34 closes a locking circuit from battery, through its locking winding 195, thence through the relay 34, operating winding 175 of relay 30, release winding 164 of relay 24, operating winding 161 of relay 20, operating winding 167 of relay 26, to ground. Relay 26 operates in this circuit, relay 24 releases, and relay 20 is closed. With relay 20 closed, a circuit may be traced from battery, through the relay 20, thence through the operating winding 212 of relay 135, relay 19, release winding 149 of relay 137, to ground. Relay 19 has been previously operated and accordingly the relay 135 is closed and relay 137 is released. Relay 135 in operating locks in a circuit from battery, through said relay, thence through its locking winding 155, operating winding 143 of relay 16, conductor 576, lower windings of relays 15 and 414, to ground. Relays 16, 15 and 414 operate in this circuit. The release of relay 137 also opens the operating circuit of the associated relay 18.

Since relays 11 and 131 have been previously operated, a circuit may now be traced from battery, through the upper contact of relay 414, contact of relay 131, lower operating windings of relays 12 and 132, upper release windings of relays 134 and 130, upper winding of relay 7, to ground. Relays 12 and 132 are operated and relays 14 and 134 are released. Relay 7 is operated to close its lower contact to charge the condenser 415. It may also be assumed that the relay 9 is in a position shown with its upper contact closed, and that when the relay was actuated to this position it causes the actuation of the counting relays 2 and 122. The circuit may be traced from battery, through the upper contact of relay 9, right contact of relay 1, which has been operated previously, left windings of relays 2 and 122, to ground. These relays operate and lock in a circuit from ground, through their right windings, left contact of relay 122, and thence through a relay 46 on the start-stop distributor associated with the second channel, and returning over conductor 577, through the right contact of relay 124, to battery. Relay 122 in operating opens at its right contact the locking circuit for relays 6 and 126 which includes the relay 46 at the distributor 42. Relays 6 and 126 thereupon release. Thus, for the first half-cycle of current generated by the oscillator 202, relays 38, 40, 25, 26, 20, 19, 16, 15, 414, 11, 131, 12, 132, 7, 8, 9, 10, 1 and 2 are in operated condition. This information, it will be noted, is given in the table opposite period 1.

Upon the next reversal of current at the oscillator 202, relays 38 and 40 are released and relays 37 and 39 are closed. With relay 39 closed, a circuit may be traced from battery, through said relay, operating winding 188 of relay 35, through the relay 30, release winding 182 of relay 33, to ground. Relay 35 is operated and relay 33 released. Relay 33 in releasing opens the circuit through the operating windings of relays 29 and 25, and these two latter relays are opened. Relay 35 in operating locks through its locking winding 196 in a circuit traceable through the operating winding 176 of relay 31 and the operating winding 168 of relay 27 to ground. Relays 31 and 27 also close. Since the relays 20 and 24 are left in the same condition as during the previous period, no further change takes place during this second period. That is, the relays 20, 19, 16, 15, 11, 12, 7, 10, 1 and 2 are operated the same as during the first period. This information may be found in the table under period No. 2.

On the next change in direction of the oscillator current, relays 38 and 40 are closed again. A circuit may now be closed from battery, through relay 40, operating winding 189 of the relay 36, through the relay 31, release winding 183 of relay 34, to ground. Relays 36, 32 and 28 are operated and relays 34, 30 and 26 release. The locking circuit for relay 36 may be traced from battery, through the locking winding 197, the operating winding 177 of relay 32, thence through the operating winding 163 of relay 24, and the release winding 162 of relay 20. Accordingly, the relay 24 operates and relay 20 releases. Relay 24 closes a circuit from battery, and thence through the operating winding of relay 136, through the relay 16, and the release winding 150 of relay 138. Relay 136 operates and relays 138 and 19 release. Relay 136 locks in a circuit from battery, through said relay, locking winding 156, operating winding of relay 17, thence over conductor 578 to the windings of polarized relays similar to relays 15 and 414 associated with a distributor similar to the distributor 130. From this point on, the relays of the distributors 130 and 120 remain the same as during the second impulse period. This information may be had by referring to the impulse period No. 3 of the table.

During the fourth period the current again changes, relays 38 and 40 are released, and relays 37 and 39 are operated. A circuit is closed from battery, through the relay 39, operating winding 186 of relay 33, through the relay 32, release winding 184 of relay 35, to ground. Relays 33, 29 and 25 are operated, and relays 35, 31 and 27 are released. Since the relays 24 and 20 remain as during the last period, no other change takes place in the frequency changer 211 or in the distributors 130 and 120 for the fourth period. Thus, in four impulse periods the distributor 208 has made a complete revolution and is ready to perform a second cycle.

During the fifth period, it will be noted from the table that relay 20 operates and accordingly a circuit is closed from battery, through said relay, through the operating winding of relay 137, to the relay 17 and the release winding 147 of relay 135, to ground. Relays 137 and 18 operate, and relays 135 and 16 release. The locking circuit of relay 137 is traceable from battery, through said relay, locking winding 157, operating winding 145 of relay 18, conductor 579, to the upper windings of relays 15 and 414, to ground. Accordingly, the relays 15 and 414 operate for the first time to close their lower contacts. A circuit may now be traced from battery, through the lower contact of relay 414, contact of relay 132, lower operating windings of relays 13 and 133, release windings of relays 131 and 11, to ground. Relays 13 and 133 close their contacts, and relays 11 and 131 release. It will be noted that the remaining relays remain as in the preceding impulse period.

During the next or sixth impulse period, only the relays of the distributor 208 change their operated condition, the remaining relays remaining the same.

During the seventh period, relay 24 is again operated, and in a manner now clear the relays 136 and 17 of the frequency changer 211 are released and relays 138 and 19 are closed. The remaining relays remain the same.

During the eighth period relays 37 and 39 operate as well as relay 25. The other relays operated during the seventh period remain unchanged.

During the ninth impulse period, the relay 16 of the frequency changer 211 is operated and relays 15 and 414 are operated to close their upper contacts. A circuit may now be traced from battery, through the upper contact of relay 414, contact of relay 133, operating windings of relays 14 and 134, release windings of relays 132 and 12, lower winding of relay 7, to ground. Relays 14 and 134 operate, and relays 12 and 132 release. Also the relay 7 operates to close its upper contact, whereby the charge on condenser 415 is discharged through the relays 8, 9 and 10. Due to the polarity of this discharge, the relays 9 and 10 are operated to close their lower contacts. A circuit may now be traced from battery, through the lower contact of relay 9, right contact of relay 2, left winding of relays 3 and 123, to ground. Relays 3 and 123 operate and lock in the manner above explained, and relays 1 and 121 are released. Thus, for the first time, a single step is taken in the counting operation of the slow-acting distributor 120. During periods 10, 11 and 12 no change takes place in the distributor 208 and the frequency changer 211.

During period 13, the relay 18 of the frequency changer is operated, and accordingly relays 15 and 414 are energized to close their lower contacts. A circuit may now be traced from battery, through the lower contact of relay 414, contact of relay 134, lower operating windings of relays 11 and 131, release windings of relays 133 and 13, to ground. Thus, relays 131 and 11 are again operated and relays 133 and 13 are released. No change, however, takes place in the slow distributor 120. The distributor 130 has thus completed a full revolution and has commenced its second cycle.

It is believed that the continued operation of the distributing mechanism may now be followed from the table, each step of which shows the exact condition of the important relays.

Referring now to the distributing equipment at the receiving end, a description will be given in conjunction with the second portion of the table. Assume that at a given instant the direction of the current generated by the oscillator 252 is such as to cause the closure of relay 68 and the opening of relay 69. Assume, also, that relays 347 and 63 have been previously operated. A circuit may be traced from battery, through the normally closed relay 70, relay 68, operating winding 332 of relay 340, relay 63, release winding 330 of relay 262, to ground. Relay 340 operates and relay 346 releases, in turn releasing the relay 263. Relay 340 completes a circuit from battery, through its locking winding 316, operating winding 308 of relay 260, operating winding 604 of relay 73, operating winding 304 of relay 72, to ground. Thus, the relays 340, 260, 73 and 72 are closed.

Assume, also, that the relay 89 has been previously closed and that relays 92, 382, 93 and 383 have also been closed. The relay 382 in operating completed a circuit from battery, through its locking winding 390, operating winding 366 of relay 92, conductor 580, lower windings of relays 95 and 96, to ground. Thus, relays 95 and 96 are operated to close their upper contacts. Assume that prior to the operation of relays 95 and 96, the distributor relays 98 and 398 have been operated. Accordingly, the relay 96 in operating completes a circuit from battery, through the contact of relay 97, upper contact of relay 96, contact of relay 98, and closed contact of the key 441, lower operating windings of relays 399 and 99, upper release windings of relays 101 and 401, to ground. Relays 99 and 399 are operated, and relays 101 and 401 are released.

At the time relays 98 and 398 operated, relay 107 was also operated in the following circuit: battery, through the contact of relay 97, lower contact of relay 96, contact of relay 101, lower winding of relay 107, closed contacts of key 441, lower windings of relays 398 and 98, upper windings of relays 100 and 400, to ground. Accordingly, relay 107 closed its upper contact, in which condition we find it during the period now under discussion. On closing its upper contact, the relay 107 connected the condenser 431 to the windings of relays 180, 181 and 106, and the charge in said condenser is discharged through these relays. This discharge causes said relays to operate to close their upper contacts.

Assume, further, that at this time the relays 108 and 408 and 113 and 413 have been previously operated. When therefore, the relay 181 closed its upper contact, a circuit was completed from battery, through the contact of relay 116, conductor 451, upper contact of relay 181, right contact of relay 108, left windings of relays 109 and 409, to ground. Relays 109 and 409 lock through their right-hand windings. The locking circuit of these relays is not shown in detail but it may be understood by tracing the locking circuit for relays 113 and 413. The locking circuit of these latter relays leads from ground, through their right-hand windings, right front contact of relay 413, thence through the release winding 570 of the start-stop distributor in the associated channel, contact of relay 115, left contact of relay 409, to battery through the key 442. In the case of the locking circuit for relays 109 and 409, however, this will extend through the left contact of relay 411. Thus, the relays 109 and 409 are locked, and the start magnet is also energized. Furthermore, relays 113 and 413 are released.

The foregoing condition of the relays described will be found set forth in the second part of the table under the first impulse period.

During the second impulse period, the current from the oscillator 252 changes direction, relay 68 releases, and relay 69 operates. A circuit is thereupon closed from battery, through the relay 69, operating winding 333 of relay 341, relay 260, release winding 331 of relay 347, to ground. Relays 341 and 60 are therefore closed and relays 347 and 63 are opened. Since the relay 89 remains in the same condition, the relays of the frequency changer 425 and the distributors 423 and 424 do not change.

In the third period, relay 68 operates again and relay 69 opens, whereupon a circuit is closed from battery, through said relay 68, operating winding 334 of relay 342, through the relay 60, release winding 324 of relay 340, to ground. Thus, relays 342, 261, 75 and 74 are closed, and relays 340, 260, 73 and 72 are opened. Again, relay 89 remains in its same condition and no change takes place in the remainder of the distributing mechanism.

In the fourth period relay 69 is closed and a circuit is traced from battery, through said relay, operating winding 335 of relay 343, relay 261, release winding 325 of relay 341, to ground. Relays 343 and 61 operated and relays 341 and 60 release. The relay 343 in operating closes a locking circuit from battery, through said relay, thence through the locking winding 319, operating winding 311 of relay 61, release winding 396 of relay 89, operating winding 394 of relay 88, to ground. Therefore, relay 89 releases and relay 88 closes.

With relay 88 closed, a circuit may be traced from battery, through relay 88, operating winding 376 of relay 380, relay 93, release winding 374 of relay 382, to ground. Relay 380 completes a circuit from battery, through its locking winding 388, relay 380, operating winding 364 of relay 90, upper windings of relays 95 and 96, to ground. Relay 90 operates and relays 95 and 96 close their lower contacts. Also, the relays 382 and 92 release. Another circuit may be traced from battery, through the contact of relay 97, lower contact of relay 96, contact of relay 99, operating windings of relays 400 and 100, upper release windings of relays 98 and 398, to ground. Relays 100 and 400 operate and relays 98 and 398 release. The remaining relays are not changed during this period.

Coming to the fifth period, relay 68 is closed and a circuit is completed through the operating winding 336 of relay 344, relay 61, release winding 326 of relay 342, to ground. Relays 344, 262, 77 and 76 are closed and relays 342, 261, 75 and 74 are opened. The relay 88 remains closed and consequently no other change takes place in the distributors 423 and 424.

In the sixth period, relay 69 is closed and a circuit is traceable therethrough, operating winding 337 of relay 345, relay 262, release winding 327 of relay 343, to ground. Relays 345 and 62 are operated, and relays 343 and 61 release. No other change takes place in the distributors during this period.

In the seventh impulse period, relay 68 is closed and relay 69 opened. A circuit is completed through the relay 68, operating winding 338 of relay 346, relay 62, release winding 328 of relay 344, to ground. Relays 346, 263, 79 and 78 are closed, and relays 344, 262, 77 and 76 are opened. No other change takes place in the equipment during this period.

In the eighth period, relay 69 is closed and a circuit may be traced through the operating winding 339 of relay 247, through the relay 263, release winding 329 of relay 345, to ground. Relays 345 and 62 are released. Relay 347 closes and locks in a circuit from battery, through said relay, locking winding 323, operating winding 315 of relay 63, through the operating winding 395 of relay 89, and release winding 393 of relay 88, to ground. Relay 63 closes, relay 89 closes, and relay 88 opens. With relay 89 closed, a circuit is traceable from battery, through said relay, operating winding 377 of relay 381, to the relay 90, release winding 375 of relay 383, to ground. Relays 381 and 91 are closed, and relays 383 and 93 are opened. No other change takes place in the equipment.

Thus, the fast distributor 422 is operated through a complete cycle and is ready to commence a new cycle of operation. During the ninth interval the relays 340, 260, 73 and 72 are again closed. The relay 89 remains closed and no further change takes place in the equipment.

No change takes place during the tenth and eleventh periods except in the distributor 422.

In the twelfth period, the relay 88 is closed and a circuit may be traced from battery, through said relay, operating winding 378 of relay 382, relay 91, release winding 372 of relay 90, to ground. Relays 380 and 90 release. Relay 382 in operating locks in a circuit from battery, through its locking winding 390, thence through the relay, operating winding 366 of relay 92, conductor 580, lower windings of relays 95 and 96, to ground. Relay 92 operates and relays 95 and 96 operate to close their upper contacts. With relay 96 operated, a circuit is traceable from battery, through the upper contact thereof, contact of relay 100, lower operating winding of relay 401, upper winding of relay 107, lower operating winding of relay 101, upper release windings of relays 99 and 399, to ground. Relays 99 and 399 release and relays 101 and 401 operate. Relay 107 also operates to close its lower contact. The condenser 431 is now charged in the opposite direction and no further change takes place in the distributor 424.

During periods 13, 14 and 15 no change takes place except in the fast distributor 422.

In the sixteenth period, relay 89 is operated and a circuit is closed from battery, through said relay, operating winding 379 of relay 383, relay 92, release winding 373 of relay 381, to ground. Relays 383 and 93 are operated, and relays 381 and 91 are released. No other change takes place during this period.

Thus, the frequency changer 425 has completed a cycle and is beginning a second cycle. During the periods 17, 18 and 19 no change takes place except in the distributor 422.

In the twentieth period, relays 93, 380 and 90 are closed and relays 95 and 96 are operated to close their lower contacts. With relay 96 thus operated, a circuit is closed from battery, through its lower contact, contact of relay 101, lower winding of relay 107, contact of key 441, operating windings of relays 398 and 98, release windings of relays 100 and 400, to ground. Relays 98 and 398 are operated and relays 100 and 400 are released. With the upper contact of relay 107 closed, condenser 431 discharges through the relays 180, 181 and 106, and these relays operate to close their lower contacts. A circuit may now be traced from battery, over conductor 451, lower contact of relay 181, right contact of relay 109, left windings of relays 110 and 410, to ground. Relays 110 and 410 operate and lock as above explained and open the locking circuit of relays 108 and 408. Thus, the first step has been taken by the slow-acting distributor 424.

In this manner, the counting action of the distributors continues cycle after cycle, the distributor 422 acting at a greater speed than the distributors 423, and the distributors 423 in turn acting at a greater speed than the distributors 424. By consulting the table, the exact condition of all of the important relays associated with these distributors may be ascertained for any given impulse period.

From what has been said hereinbefore, it will now appear that as the distributors 120, 130 and 208 at the sending end rotate, they cooperate with each other synchronously in such a manner, or, stated in other words, each distributor is at the proper point in its cycle once every so often, to establish an impulse circuit from each incoming channel through to the single line 213. Inasmuch as there are 96 of these channels, the distributors are so timed in their operation that no two channels are closed through to the line 213 simultaneously. Instead, the closures take place in an orderly and a sequential fashion, one after the other. The duration of closure is determined by the duration of closure of the relays 37 and 38, which are fast-operating relays. It is at these points that the changes in the impulse circuits are most rapid. In the distributor 130, the impulse circuits are closed for a considerable period before and after they are completed through the relays 25 and 38. Likewise, the impulse circuits through the distributor 120 are closed for a considerable period before and after they are completed at the distributor 130. Thus, the distributor 120 has a considerable amount of overlap allowing more or less inaccurate operation without detrimental effects. Also, the distributor 130 has a considerable amount of overlap with respect to the distributor 208.

To consider a specific instance, assume that the apparatus has reached the precise point in its operation for completing the first channel 22 through to the line 213. The impulse circuit for the transmission of a signal impulse from this channel is indicated by the heavy line and is seen to lead from the sending contacts 47 of the start-stop distributor through the left contact of relay 1, upper contacts of relays 10, 11, and 15, conductor 418, through the relay 25, relay 38, to the line 213. Thus, it is necessary that the relay 1 be operated, that the relays 10, 11 and 15 be operated to close their upper contacts, and that the relays 25 and 38 be closed. From an examination of the table hereinbefore given, it will be found that these conditions exist during the first impulse period in the table. Inspecting the table on both sides of the first impulse period, it will be found that some of the slower acting relays have been energized for a considerable time prior to the arrival of the equipment in the first period and will also remain energized for a considerable time subsequent to the first period. The fast-operating relay 25 is closed for twice as long as relay 38. The interval during which the circuit is complete is determined by relay 38.

On the receiving end, distributor 422 takes only half the time for one step that distributor 408 requires for one step, and relays 65 and 60 which determine the length of the operating pulses for relays 80, 81, 82, etc., operate twice as fast as relays 37, 38, etc., so that relays 80 and 81, etc., are under the control of the pulses for only half of the pulses. By proper arrangement of the commencement of the electric circuit, the phase relation between receiving and sending distributors may be made such that only the central or best portion of the impulses is used.

In a similar manner, it may be noted that the second channel which leads through the left contact of relay 2 has access to the line 213 during the seventeenth impulse period, or exactly sixteen periods later. In like manner, the third, fourth, fifth and sixth channels gain access in succession to the line 213 at intervals of sixteen impulse periods apart. This may be verified by consulting the table.

The same general explanation may be given with respect to the distributing equipment at the receiving end of the line. The distributors rotate with respect to one another at such speeds and are so timed that the impulses incoming on the single line 253 representing a maximum of 96 sending channels are distributed in sequential order to the corresponding 96 receiving channels.

It was explained that the relays 135 and 136 are so adjusted that a succession of current impulses and spaces cause corresponding reversals of current through the left winding of the tranformer 235 and also through the windings 266 and 264. The winding 266 belongs to the relay 66 and the winding 264 to the relay 65. The relays 66 and 65 are so adjusted that one of these relays closes and the other opens in response to a current impulse in the line 253, and reverse this operation in response to a succeeding space of no current. When, therefore, the distributor 422 is in a position where relays 72 and 60 are closed as hereinbefore explained, either the relay 65 or the relay 66 will be closed and the other relay opened depending upon whether the signal impulse received over the line 253 is marking or spacing. If the relay 66 is closed, then a circuit may be traced from battery, through the relay 67, relay 66, relay 73, winding 275, operating winding 280 of the relay 80, release winding 283 of the relay 81, to ground. Relay 80, therefore, is closed and relay 81 is maintained open. With relay 80 closed, the circuit may be closed from battery, through said relay, thence over the conductor 427, through the locking winding of said relay, upper winding of polarized relay 94, to ground.

Had the relay 65 been closed instead, then a circuit would have been traced from battery, through the relay 67, relay 65, relay 72, release winding 281 of relay 80, operating winding 282 of relay 81, to ground. In this case, the relay 81 is closed and a circuit is traceable over conductor 426, through the lower winding of the polarized relay 94, to ground.

In like manner, the relays 282 and 83, and 84 and 85, and 86 and 87 close impulse circuits through to three other relays similar to relay 94 during the sequential operation of distributor 422.

According to whether the relay 94 is operated to close its upper or lower contacts, either positive or negative polarity is connected through the upper or lower contacts of relay 95 depending upon the position of this relay, and thence through the sequentially closed contacts of relays 398, 399, 400 and 401 to the windings of relays 102, 103, 104 and 105. Assuming the distributor 423 is in such a position that relay 398 is operated, a circuit may be traced over the heavy line to the winding of relay 102. According, therefore, to whether the relay 102 is operated at its upper or lower contacts, plus or minus potential is applied to the conductor 429 through one or the other of the contacts 106 and thence through contacts of the sequentially closed relays 108, 109, etc., through the windings of relays similar to the relay 114. If relay 106 has its upper contact closed and the relay 108 is operated at this time, the impulse circuit leads over the heavy conductor 432 to the winding of relay 114 shown. If the polarity is in the proper direction, the relay 114 closes its contact and completes a circuit for the code magnet 564 of the start-stop distributor associated with the corresponding channel.

Considering the condition of the distributors at the instant a circuit is completed for associating the first channel with the line 253, it will be found that relay 108 is operated; relay 106 operated to close its upper contact; relay 107 operated to close its upper contact; relays 98, 398, 101" and 401 operated; relay 95 is operated to close its lower contact; relays 93 and 90 of the frequency changer 425 are closed; relay 88 closes; relays 75, 74 and 61 of the distributor 422 are closed; and relay 69 is closed. From an examination of the second portion of the above table, it is seen that this set of conditions occurs during the 180th impulse period. From the drawing it will be seen that the circuit of relay 114 is maintained until either the relay 107 or 108 releases, or the relay 106 operates to close its lower contact, or the relay 102 operates to close its lower contact regardless of what changes may take place in the fast distributor 422. By inspecting the table, it appears that relay 108 remains operated through to the twentieth impulse period of the next cycle. It also appears that the relay 106 does not change its condition until the twentieth impulse period of the next cycle. Moreover, the relay 102 will not change until the relays 398 and 98 are again operated, which does not occur until the twentieth period of the succeeding cycle. Accordingly, the operating circuits for the start-stop equipment are maintained closed for an ample time to insure their operation, notwithstanding the high rate of speed at which the fast distributors are rotating.

In a similar manner, it will be found by inspecting the table that the delivery of a signal to the second, third, fourth, fifth and sixth channels represented by the conductors 434 commences respectively in the 20th impulse period, 52nd period, 84th period, 116th period, and 148th period of the succeeding cycle of 192 periods.

It will be understood that the foregoing tables may be commenced at any point other than those selected. These tables, in effect, represent closed operations. That is to say, the termination of a table may be considered as joined to the beginning to give a closed series.

It will be clear that many modifications may be made of the system herein disclosed. It may be arranged to drive the distributors at greater or less speeds, according as the transmission system requires. Moreover, it may be desirable to transmit the impulse directly from the first central office to the second central office over a properly designed transmission line without the use of high frequency carrier currents.

Line 418 may be used to modulate a carrier current or to send signals directly to a trunk line, giving a multiplex of six channels, or line 416 may be used in a similar manner to obtain a multiplex of six channels. The amount of traffic and values of the circuit determine the multiplicity used.

Figure 3:
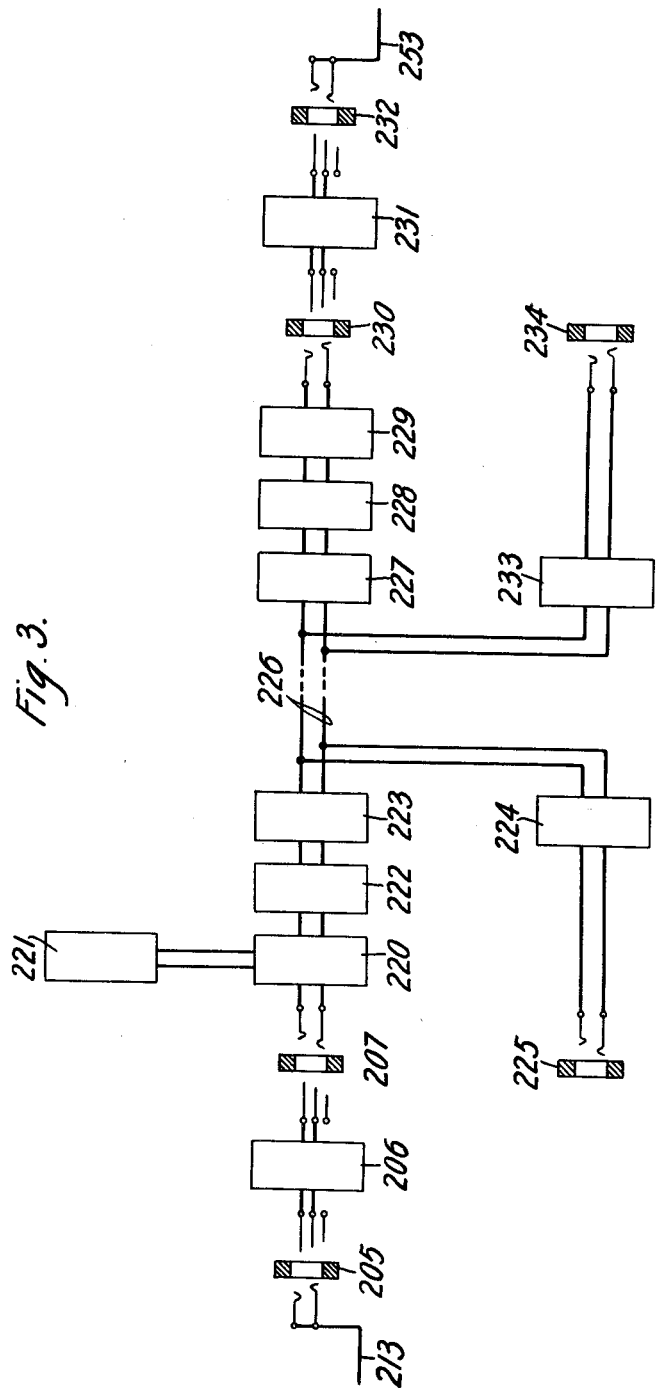

While the apparatus in Fig. 3 has been shown in a diagrammatic manner, it will be clear to those skilled in the art that any suitable type of high frequency channels, modulators, and any suitable design of amplifiers and filters may be employed. Furthermore, the oscillators 202 and 252 are merely shown as indicating one type which may be used at these stations. Any other suitable design whatsoever, of course, could be employed.

*Phasing the sending and receiving apparatus.*

Figure 4:
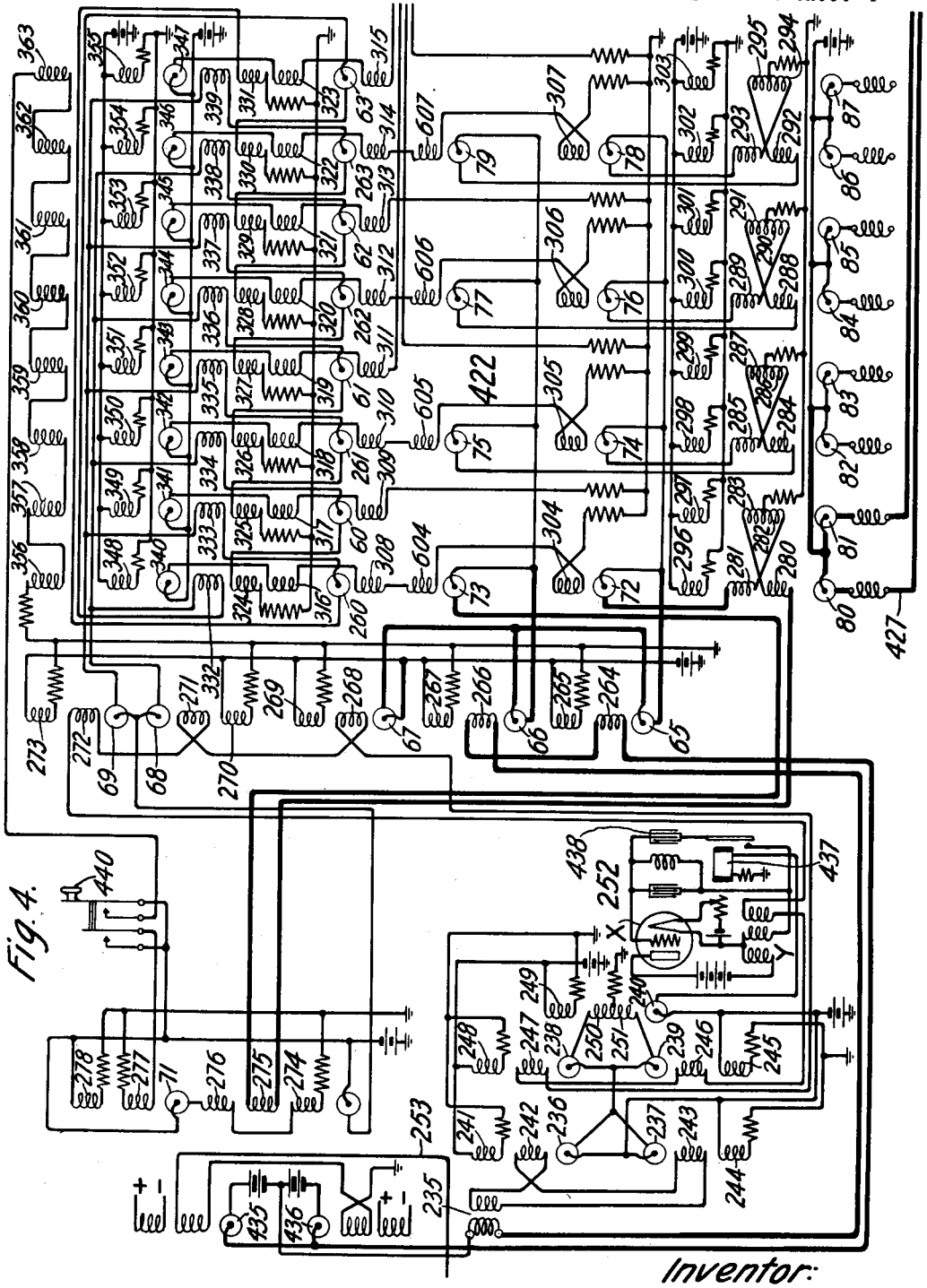

In order that the apparatus at the receiving station, shown in Figs. 4, 5, and 6, may be brought into synchronism or in phase with the distributors at the sending office, the phasing keys 440, 441 and 442 are provided. Briefly, the function of the phasing keys is to arrest the operation of the distributors if they are already operating and to set them in a given condition.

The key 440 when depressed completes a circuit from battery, through its left contact, winding 277 of the relay 71, to ground. Current flowing through the winding 277 causes the relay 71, which is normally open, to close. A circuit is now traceable from battery, through the relay 71, locking winding 276 of relay 71, thence through the winding 274 of relay 70, to ground. Current flowing through the winding 274 causes the relay 70, which is normally closed, to open. The key 440 may be released and the relays 70 and 71 will remain in this condition. The opening of relay 70 prevents the continued operation of the distributor 422.

Moreover, key 440 when depressed causes the completion of a circuit from battery, through its right contacts, thence through the windings 356 to 363 inclusive, to ground. Current flowing through the windings 358 to 363 inclusive causes the corresponding relays 342, 343, etc., to release. Current flowing through the windings 356 and 357, however, causes the relays 340 and 341 to operate. Thus, the depression of the phasing key 440 sets the distributor 422 in the condition where the first two relays are closed and all other relays are open.

In like manner, it will be found that the depression of key 441 causes the operation of the first two sets of relays 98, 398 and 99, 399 of the distributor 423 and the release of the last two sets of relays.

Similarly, the depression of the phasing key 442 causes the release of all relays of the distributor 424, except the first two pairs 108, 408 and 109, 409.

With the distributors at the receiving station in this condition, the apparatus is ready to be synchronized with the distributors at the sending station. In order that synchronizing impulses may be transmitted from the sending station to the receiving station, there may be provided a separate channel, similar to one of the 96 channels described, over which impulses may be transmitted simply for synchronizing purposes at the required times. If desirable, one of the 96 channels shown may be devoted to synchronizing, in which case the left contact of the relay 1 of the distributor 120 would lead to the contact of a switch 770, as shown by the dotted line. After the distributors 120, 130 and 208 at the sending station have been set in operation, the switch 770 may be closed to transmit the synchronizing impulses. Thereafter, each time the distributors 120, 130 and 208 arrive at the proper relative phase relation with each other, a circuit is completed from ground, through the switch 770, over the contact of relay 1, contact of relay 10, contact of relay 11, contact of relay 15, and thence through the relays 25 and 38 to the line 213. At the receiving station the first incoming synchronizing impulse after the distributors have been set by the phasing keys, causes current to flow through the winding 275 of the relay 71. Relay 275 releases the relay 71, whereupon current ceases to flow through the winding 274 of relay 70. Therefore, the relay 70 immediately closes and the distributor 422 starts in operation, followed by the initiation and operation of the distributors 423 and 424. Thus, the distributors at the receiving end are started in exact phase relation with the distributors at the sending station.

It is also to be understood that the frequency changer 425 has similar circuits which place its various relays in proper phase condition.

A similar circuit may also be provided at the sending end to facilitate the start at that station.

It will be understood that the other distributing mechanisms similar to 423 and 424 operate a definite amount out of phase with the mechanism shown in the drawing. That is to say, there is a gradual displacement in phase between the successive distributing mechanisms 423 and successive distributing mechanisms 424, all of which are controlled by the sending distributor 422. Accordingly, in order that all distributing mechanisms may start at the proper point, the phasing keys may be arranged to cause the different distributing mechanisms to take different settings. For instance, the next distributing mechanism following the distributor 423 may be set such that relays 99 and 100 are operated and the remaining relays are released. Some other distributing mechanism would be set such that relays 100 and 101 are operated, whereas the remaining relays are released.

What is claimed is:

1. In an exchange system, a central office, a plurality of subscribers' lines leading to said office, transmitters at each of the subscribers' stations, a multiplex distributor at the central office having a plurality of channels incoming thereto, operators' connecting circuits for interconnecting said lines and also for connecting simultaneously a plurality of said lines to respective ones of said channels, signal receiving and storing devices associated with each channel and operable independently of each other in response to said transmitters to store the message signals sent over said lines, and a single transmission line outgoing from the central office, said multiplex distributor arranged to receive the message signals stored in all of said channels and to deliver them in a definite sequential order to the transmission line.

2. In an exchange system, a central office, a plurality of subscribers' lines leading to said office, transmitters and receivers at each of the subscribers' stations, a transmitter at any station serving to operate the receiver at any other station, a multiplex distributor at the central office having a plurality of channels incoming thereto, operators' cord circuits for interconnecting any two of said lines and also for connecting simultaneously a plurality of said lines to respective ones of said channels, signal receiving and storing devices associated with each channel and operable in response to said transmitters to store the message signals sent over said lines, and a transmission line outgoing from the central office, said multiplex distributor arranged to receive the message signals stored in all of said channels and to deliver them in a definite order to the transmission line.

3. In an exchange system, a central office, a plurality of subscribers' lines leading to said office, telephone and telegraph equipment at each subscriber's substation connected to one of said lines, operators' cord circuits at the central office for interconnecting any two of said lines for communication thereover with either said telephone or said telegraph equipment, a multiplex distributor, a transmission line outgoing from the central office, and means including said cord circuits for associating a plurality of subscribers' lines with said distributor for distributing to said transmission line a signaling current representing all messages simultaneously transmitted over said subscribers' lines.

4. In an exchange system, a central office, subscribers' lines leading to said office, a transmitter at each substation for sending signaling currents having a frequency of the order of voice currents, operators' connecting circuits for interconnecting a calling and a called line, message receiving means at each substation responsive to said transmitters, a transmission line outgoing from the central office, a multiplex distributor, means included in said connecting circuits for connecting a plurality of said lines to said multiplex distributor, and means responsive to signaling currents transmitted over said lines for operating said distributor to deliver to the transmission line a signaling current representing all messages sent over said subscribers' lines.

5. In an exchange system, a central office, a plurality of calling subscribers' lines leading to said office, transmitters at each of the subscribers' stations, a multiplex distributor at the central office having a plurality of channels incoming thereto, operators' connecting circuits for interconnecting said lines and also for connecting simultaneously a plurality of said lines to respective ones of said channels, a transmission line outgoing from the central office, said multiplex distributor arranged to receive the message signals in all of said channels and to deliver them to the transmission line, a plurality of called subscribers' lines, and a multiplex distributor responsive to signals in said transmission line to distribute to said called lines signal impulses representing the messages sent over the respective calling subscribers' lines.

6. In an exchange system, a central office, a plurality of subscribers' lines terminating in said office, transmitters at each of the subscribers' stations, a plurality of start-stop distributors at the central office, operators' cord circuits for interconnecting said lines and also for connecting a plurality of said lines to respective ones of said start-stop distributors, said start-stop distributors being responsive to the transmitters at the substation for storing message signals, a multiplex distributor, a transmission line outgoing from the central office, and means for delivering to the multiplex distributor the message signals stored in said start-stop distributors, said multiplex distributor serving to combine the several message signals into a single current for transmission over the transmission line.

7. In an exchange system, a central office, a plurality of subscribers' lines leading to said office, transmitters at each of the subscribers' stations, a multiplex distributor at the central office, a plurality of storing distributors, operators' cord circuits for interconnecting said lines and also for connecting simultaneously a plurality of said lines to respective ones of said storing distributors, said storing distributors being responsive to the transmitters at the substations for storing message signals, a transmission line, means whereby said multiplex distributor receives the message signals stored in said storing distributors and combines them into a single signaling current for transmission over said line, and means controlled jointly by the transmitting subscriber's line and the multiplex distributor for determining the instant when the storing distributor commences to deliver signals to the multiplex distributor.

8. In a signaling system, a plurality of transmission channels, a single transmission line common to said channels, means for sending signals of a given frequency in each of said channels, and distributing equipment arranged to receive the signals from all channels and by a number of steps of successively increasing frequency to combine said signals into a single signaling current of higher frequency for transmission over said line.

9. In a signaling system, a plurality of transmission channels, a transmission line common to said channels, means for sending signals of a low frequency in each channel, the frequency in all channels being the same, and distributing mechanisms arranged to receive the signals from all channels and by a number of steps of successively increasing frequency to combine said signals into a single signaling current of high frequency for transmission over said line.

10. In a signaling system, a plurality of channels divided into groups, a single transmission line, means for sending signal currents of a given frequency in each of said channels, means for combining the signal currents in each group of channels into a single current of higher frequency, and means for combining all of said higher frequency currents into a single current of still higher frequency for transmission over said line.

11. In a signaling system, a plurality of channels, a transmission line common to all channels, means for sending signals of a given frequency in each of said channels, and a distributor comprising a plurality of sections each operating at a speed greater than the preceding section for receiving the signals from all channels and by successively increasing the frequency to combine said signals into a single signaling current of higher frequency for transmission over said line.

12. In a signaling system, a plurality of transmission channels, a transmission line common to said channels, means for sending in each of said channels at a given frequency signal impulses having a given duration, and distributing equipment arranged to receive signals from all channels and by a number of steps of successively increasing frequency to successively decrease the duration of said impulses and combine them into a single impulse signaling current of higher frequency for transmission over said line.

13. In a signaling system, a plurality of subscribers' lines, a storing distributor for each line operable to store signaling currents transmitted over said lines, a transmission line, and a multiplex distributing mechanism arranged to receive the signals stored in said first mentioned distributors and operable by progressively increasing the frequency of said signals to combine them into a single signaling current of higher frequency for transmission over said line.

14. In a signaling system, a plurality of receiving channels, a transmission line, means for sending over said line a signaling current of high frequency representing a plurality of separate messages, and distributing mechanism arranged to receive said current and by a number of steps of successively decreasing frequency to separate the same into signaling currents of a low frequency each of which represents a respective one of said messages and is distributed to a separate one of said receiving channels.

15. In a signaling system, a plurality of receiving channels divided into groups, a transmission line, means for sending over said line a signaling current of high frequency representing a plurality of separate messages, means for separating said high frequency signaling current and combining all the signaling currents pertaining to each of said groups of channels into a single current of lower frequency, means for separating each of these lower frequency signaling currents into signaling currents of still lower frequency, and means for delivering said last mentioned currents to the respective receiving channels.

16. In combination, a plurality of signaling channels, a transmission line, means for sending signaling current of a given frequency in each of said channels, means for combining the currents in all channels into a single current of higher frequency, a source of carrier current of still higher frequency, and means for modulating the carrier current in accordance with said single high frequency signaling current for transmission over said line.

17. In combination, a plurality of signaling channels, a transmission line, means for sending signaling current of a given frequency in each of said channels, means for combining the currents in all channels into a single current of higher frequency, a source of carrier current of still higher frequency, means for modulating the carrier current in accordance with said single high frequency signaling current for transmission over said line, means for demodulating the carrier current transmitted over said line, a plurality of receiving channels, and means for reducing the frequency of the signaling current after demodulation and delivering the same to said receiving channels.

18. In a telegraph system, means for generating high frequency signals, a multiplex distributor comprising slow-acting electromagnetic relays and quick-acting thermionic relays said thermionic relays being arranged to distribute said high frequency signals to said electromagnetic relays.

19. In an exchange system, subscribers' stations, a central office, lines between the central office and substations, means to connect one substation line to another, means to transmit over the line direct current from the central office, telegraphic transmitting apparatus at the substation responsive to said direct current and adapted to generate alternating current signals of voice frequency, means to transmit said signals over the established connection to a distant subscriber's station, and means at the distant subscriber's station to receive said code signals.

20. In an exchange system, a plurality of central offices, lines leading from one office to each of the others, subscribers' lines entering said offices, multiplex telegraph transmitting and receiving equipment in said offices, and sending and receiving equipment for each of said subscribers' lines, all multiplex channels being adjusted to fall within certain limits of sending and receiving, the subscribers' sending and receiving equipment being adjusted to fall within the limits of said multiplex channels.

In witness whereof, I hereunto subscribe my name this 16th day of September, A. D., 1925.

LOUIS M. POTTS.